United States Patent [19]

Smith

[11] Patent Number: 4,870,596

[45] Date of Patent: * Sep. 26, 1989

[54] METHOD AND APPARATUS FOR DISPENSING MONEY ORDERS

[75] Inventor: Lawrence G. Smith, Orlando, Fla.

[73] Assignee: Republic Money Orders, Inc., Dallas, Tex.

[*] Notice: The portion of the term of this patent subsequent to Nov. 25, 2003 has been disclaimed.

[21] Appl. No.: 121,074

[22] Filed: Nov. 16, 1987

Related U.S. Application Data

[60] Continuation of Ser. No. 60,762, Jun. 8, 1987, Pat. No. 4,812,986, which is a division of Ser. No. 877,539, Oct. 31, 1986, Pat. No. 4,699,532, which is a division of Ser. No. 596,291, Apr. 3, 1984, Pat. No. 4,625,275.

[51] Int. Cl.⁴ .................. G06F 15/21; G06F 15/30; B41J 5/00
[52] U.S. Cl. .................. 364/479; 235/379; 902/1
[58] Field of Search .......... 364/400, 401, 406, 408, 364/478, 479, 405, 519, 200 MS File, 900 MS File; 235/375, 379–382.5, 431, 432, 433; 400/50, 103–106, 121, 124; 380/24

[56] References Cited

U.S. PATENT DOCUMENTS

| | | | |
|---|---|---|---|
| 3,814,227 | 6/1974 | Hurd, III et al. | 400/121 |
| 3,848,798 | 11/1974 | Riley | 235/101 |
| 3,970,992 | 7/1976 | Boothroyd | 364/900 |
| 3,984,660 | 10/1976 | Oka et al. | 235/379 |
| 3,997,763 | 12/1976 | Schasser | 235/432 |
| 4,025,905 | 5/1977 | Gorgens | 364/900 |
| 4,035,792 | 7/1977 | Price et al. | 340/570 X |
| 4,053,735 | 10/1977 | Foudos | 364/401 X |
| 4,082,945 | 4/1978 | van de Goor et al. | 235/379 |
| 4,175,694 | 11/1979 | Donabin | 235/431 X |
| 4,225,779 | 9/1980 | Sano et al. | 364/900 X |
| 4,266,121 | 5/1981 | Hirose | 235/381 |
| 4,270,042 | 5/1981 | Case | 235/379 |
| 4,317,028 | 2/1982 | Simjian | 235/379 X |
| 4,341,951 | 7/1982 | Benton | 364/406 X |
| 4,355,369 | 10/1982 | Garuin | 364/900 |
| 4,385,285 | 5/1983 | Horst et al. | 235/379 X |
| 4,417,137 | 11/1983 | Lundblad | 235/379 |
| 4,625,275 | 11/1986 | Smith | 364/479 X |
| 4,699,532 | 10/1987 | Smith | 364/479 X |

Primary Examiner—Joseph Ruggiero
Attorney, Agent, or Firm—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory ($E^2$-PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

9 Claims, 3 Drawing Sheets

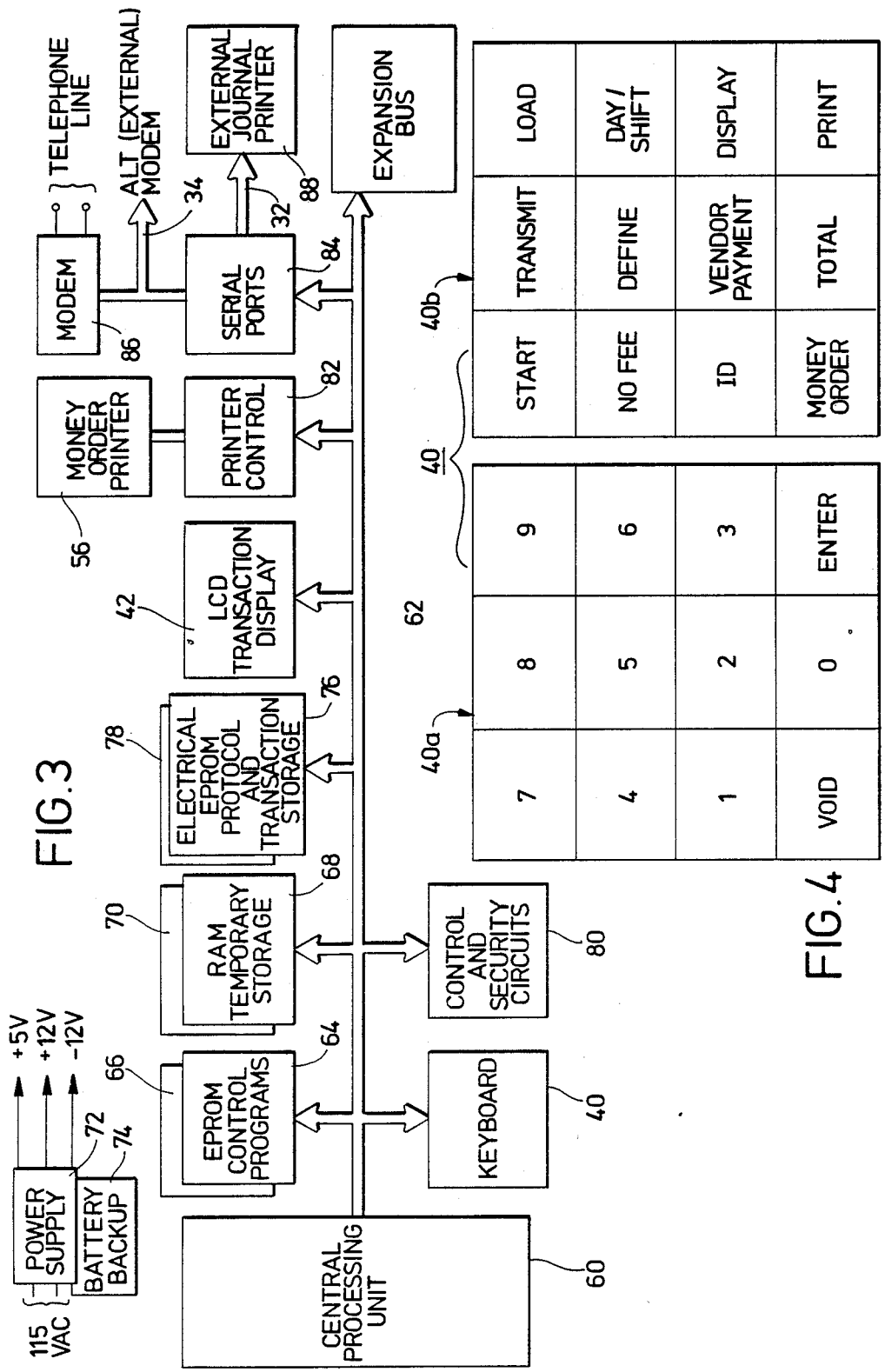

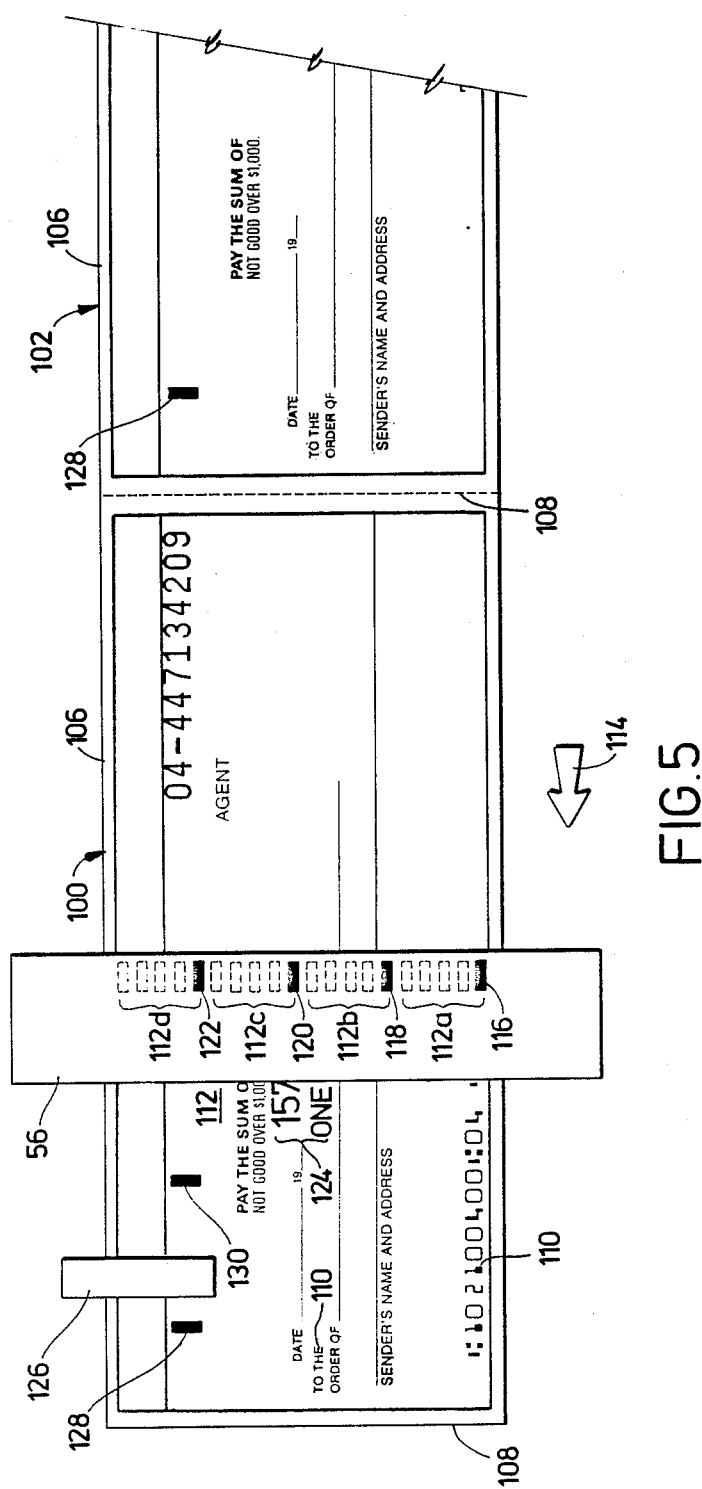

METHOD AND APPARATUS FOR DISPENSING MONEY ORDERS

This is a continuation of application Ser. No. 07/060,762 filed on June 8, 1987, now U.S. Pat. No. 4,812,986, which is a division of application Ser. No. 06/877,539 filed on Oct. 31, 1986, now U.S. Pat. No. 4,699,532, which is a division of application Ser. No. 06/596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vender portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2$PROM). This $E^2$PROM stores a security inhibit printing code which must be "recognized" by a printer software routine to enable the dot matrix printer. Each dispenser further stores a control software routine which operates to change or erase the security inhibit printing code stored in the $E^2$PROM when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2$PROM associated with each processor.

BRIEF DESCRIPTION OF THE DRAWINGS

For a more complete understanding of the present invention and the advantages thereof, reference is now made to the following Description taken in conjunction with the accompanying Drawings in which:

FIG. 3 is a block diagram of the electronic hardware incorporated in the money order dispenser of FIG. 2;

FIG. 4 is a representation of the preferred embodiment of the keyboard used in the money order dispenser of FIG. 2; and FIG. 5 is a top view of the dot matrix printer incorporated in the dispenser of FIG. 2 detailing the movement of a money order therethrough.

DETAILED DESCRIPTION

Figure 1:
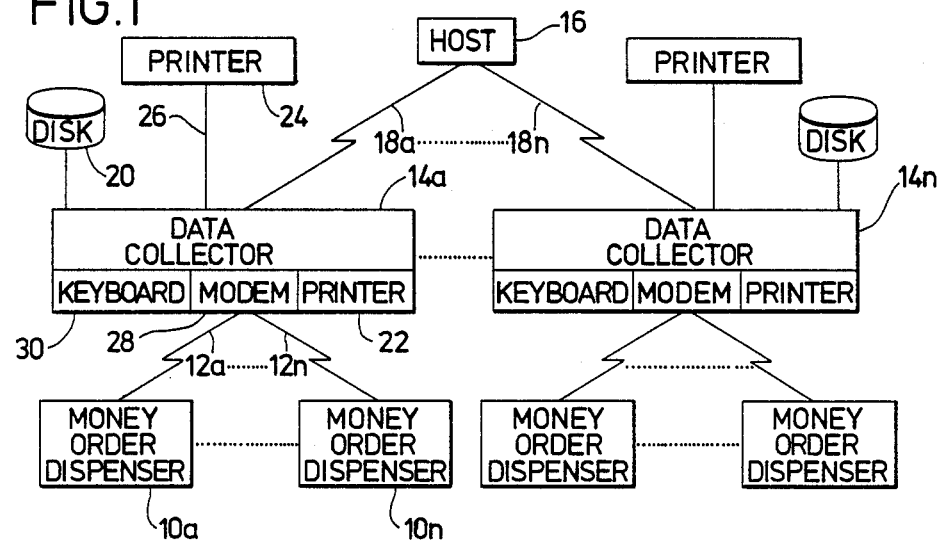
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a–10n on a time-shared basis. In the preferred embodiment, a plurality of data collectors 14a–14n are connected to a host device 16 through communications links 18a–18n. Each communications link 18 is either A modem an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a–10n. Data collector 14a also includes an internal printer 22 for printing this transaction information, although alternately, an external printer 24 is used for this purpose through an RS232 serial link 26. An internal modem 28 is also provided for direct communications to the money order dispensers 10a–10n over the communications links 12a–12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
|---|---|
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning issued |
| [-WARN-#TRANS XX-] | Amount of transaction storage left in dispenser memory when warning is issued |
| [-LOCK # ERRORS XX-] | Number of errors allowed before |

TABLE I-continued

| VARIABLE NAME | DEFINITION |
|---|---|
| | dispenser locks. |

As used throughout the remainder of the specification, the above limits and codes are referred to as "control" data. This control data is transmitted to the various money order devices 10a–10n located at the plurality of retail establishments.

Preferably, each of the other data collectors 14 shown in FIG. 1 include the same type of peripheral devices associated with the data collector 14a. The data collectors 14a–14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
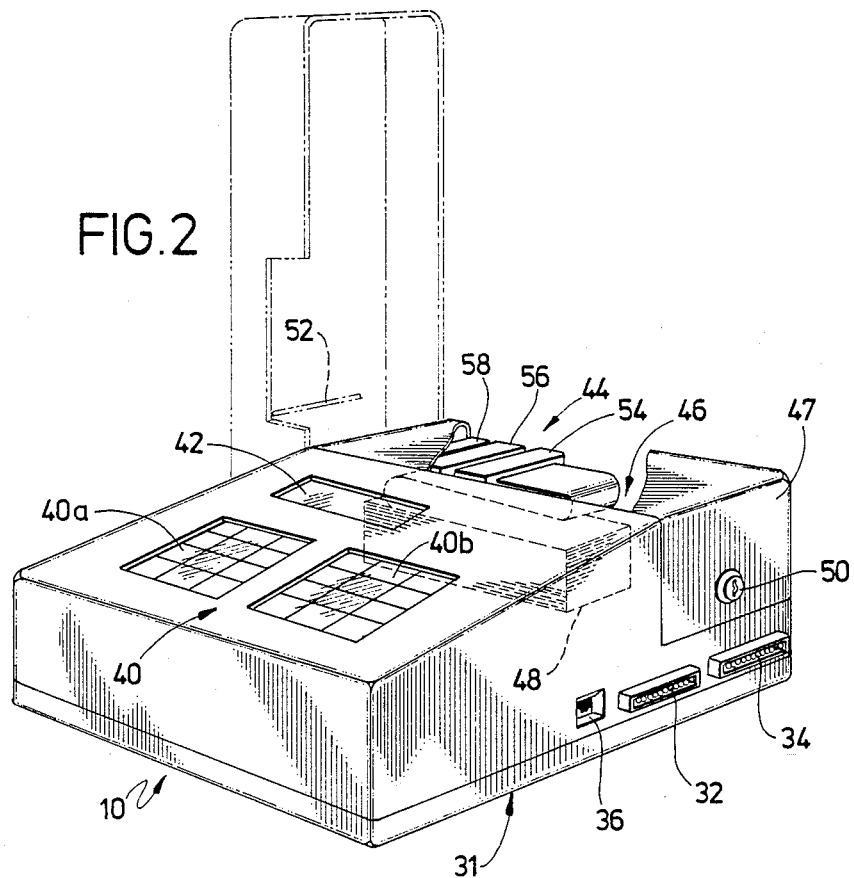
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection which (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM'S 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories (E$^2$PROM's), or equivalent semi-permanent memory device such as a battery support RAM, 76 and 78 connected to the CPU 60 by the bus 62. The E$^2$PROM 76 is provided for storing various communication protocols utilized by the money order dispenser. In particular, the E$^2$PROM 76 supports the NCR foreign attachment protocol, MSI special protocol, SDLC protocol and IBM 3680 store system interface. Additional protocols may be down-loaded into the E$^2$PROM 76 by the data collector as required. Data and control codes for the above protocols are well known in the prior art and a description thereof is unnecessary for a complete understanding of the present invention.

According to a feature of the present invention, the E$^2$PROM 78 is provided to store the transaction data for between 500-2000 vendor/customer transactions. Moreover, the E$^2$PROM 78 also stores a security inhibit printing code for the money order dispenser 10 for security purposes. The printer software routine for controlling the dot matrix printer 56 must "recognize" the security inhibit printing code resident in E$^2$PROM 78 in order to operate the dot matrix printer 56. If the security of the money order dispenser is compromised in any way, a control software routine stored in EPROM 64 operates to change or erase the security inhibit printing code stored in the E$^2$PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the E$^2$PROM 78 is approximately filled with transaction data. The money order dispenser 10 will discontinue further issuance of money orders and notify the operator if the E$^2$PROM 46 is full. According to the present invention, the transaction data is then transmitted to the respective data collector device of FIG. 1 before the money order dispenser 10 may again issue money orders. The use of the non-volatile reusable E$^2$PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY #_-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE       X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0-No ID Number needs to be entered;
1-All ID Numbers are entered at the start of the day only;
2-A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be display:

[-ID          -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed.

The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "LOAD MODE", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY #        -]

[-BEG #XXXXXXXX-]

[-END #XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY #        -]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:

[-DISCONNECT RMOD-]

This constitutes the transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of incidia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA
           PAGE
;EEPROM DATA LOCATED AT E000H-E3FFH
EPRM      SEGMENT AT 0E000H
;DOWN LOADED STORE INFORMATION
SCRTY     DW       ?              :SECURITY NUMBER
STACC     DW       ?              :STORE # MAJOR ACCOUNT
STSTE     DB       ?              :STORE # STATE
STSUB     DB       ?              :STORE # SUB ACCOUNT
STDIV     DW       ?              :STORE # DIVISION
STSTR     DW       ?              :STORE # STORE
MONTH     DB       ?              :DATE MONTH
DAY       DB       ?              :DATE DAY
YEAR      DB       ?              :DATE YEAR
PHONE     DB       11 DUP(?)      :TELEPHONE NUMBER

USE       DB       ?              :ID USE CODE 0 NO 1 NEEDS TO
                                   BE ENTERED
                                  :1=ONE ID PER SHIFT/DAY
                                  :2=ID FOR EVERY TRANSACTION
ID        DB       NID DUP(?)     :IDENTIFICATION NUMBERS

;RMOD STATUS INDICATORS - 0/1
RMODS     DB       ?              :RMOD STATUS - CLOSED/OPEN
MODMS     DB       ?              :MODEM STATUS - DISCNCT/DNCT
CMPPS     DB       ?              :MC PRINTER STATUS -
                                   OK/DISABLED
JRRRS     DB       ?              :JR PRINTER STATUS - OK
                                   DISABLED

RO Assembler 03-06-84             PAGE 1-8

EEPROM DATA AREA

KEYBS     DB       ?              :KEYBOARD STATUS - OK/LOCKED

;DATA DETERMINED AT RUN TIME-STORED HERE TO PRESERVE WHEN POWER
OFF
LOCKC     DB       ?              :ERROR COUNT BEFORE LOCKUP
TRPTR     DB       ?              :TRANSACTION POINTER
TXPTR     DB       ?              :TRANSMISSION POINTER
FIDT      DB       NID DUP (?)    :FEE TOTAL PER ID

MCNT      DW       ?              :MO NUMBER TOTAL
MAMT      DD       ?              :MO AMOUNT TOTAL
VCNT      DW       ?              :VP NUMBER TOTAL
VAMT      DD       ?              :VP AMOUNT TOTAL
FAMT      DD       ?              :FE AMOUNT TOTAL
VOID      DW       ?              :NUMBER OF VOIDS
TCNT      DW       ?              :TOTAL TRANSACTIONS
TAMT      DD       ?              :TOTAL AMOUNT

;TRANSACTION BUFFER-FILLS UP REST OF EEPROM-ROTATING BUFFER
TRBFRS    DB       ?              :START OF TRANSACTION BUFFER
TRBFRE    DB       ?              :END OF TRANSACTION BUFFER
EPRM      ENDS

;EEPROM DATA LOCATED E4000H-E5FFFH
;DOWN LOADED PROTOCOL INFORMATION
EPRM      SEGMENT AT 0E400H
;$$$NO DATA DEFINED$$$
EPRM      ENDS
SUBTTL    START OF PROGRAM - POWER OF SELF TEST AND
          INITIALIZATION AT FE000H
```

START OF PROGRAM

PAGE

```
CODE    SEGMENT OF AFE00H
START:  CLI                     ;DISABLE INTERRUPTS
                                ;TEST FLAGS, REGISTERS,
                                    CONDITIONAL JUMPS
        MOV     AH,0D5H         ;SET FLAGS-SF,ZF,AF,PF,CF
        SAHF
        JNS     STERR
        JNZ     STERR
        JNP     STERR
        JNC     STERR
        LAHF
        MOV     CL,5            ;SET CARRY
        SHR     AH,CL
        JNC     STERR
        MOV     AL,40H           ;SET OVERFLOW
        SHL     AL,1
        JNO     STERR
        XOR     AX,AX           ;CLEAR FLAGS
        SAHF
        JS      STERR
        JZ      STERR
        JP      STERR
        JC      STERR
        LAHF
        MOV     CL,5            ;RESET CARRY
        SHR     AH,CL
        JC      STERR
        SHL     AH,1            ;RESET OVERFLOW
        JO      STERR
                                ;TEST REGISTERS WITH ALL ONE'S
                                    AND ZERO'S
        MOV     AX,0FFFFH
        STC                     ;SET CARRY - LOOP CONTROL
STRT1:  MOV     DX,AX           ;LOOP TO WRITE PATTERN TO ALL
                                    REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI           ;END OF FIRST TIME THROUGH
        JNZ     STERR           ;PATTERN NOT ALL ONE'S
        CLC                     ;CLEAR CARRY
        JNC     STRT1           ;REPEAT WITH ALL ZERO'S
STERR:  HLT                     ;POWER ON SELF TEST ERROR
STRT2:  OR      AX,DI           ;END OF SECOND TIME THROUGH
        JNZ     STERR           ;PATTERN NOT ALL ZERO'S
                                ;TEST RAM WITH FF,AA,55,01,00
                                    PATTERNS
        SUB     AX,AX           ;INITIALIZE ES & DS
        MOV     ES,AX
        MOV     DS,AX
        SUB     DI,DI
        MOV     BX,LMCSD        ;COMPUTE UPPER LIMIT OF RAM
        MOV     CL,4
        SHL     BX,CL           ;CANNOT BE > 0FFFFH
        OR      BX,002EH        ;RAM COUNT
        MOV     AX,0FFFFH
        MOVE    DX,55AAH
        CT?                     ;INCREMENT FLAG
        M       CX,BX           ;COUNT
        REP     STOSB           ;FILL RAM WITH FIRST PATTERN
STRT3:  DEC     DI              ;POINT TO LAST BYTE
        STD                     ;DECREMENT FLAG
STRT4:  MOV     SI,DI
        MOV     CX,BX
STRT5:  LODSB                   ;READ PATTERN STORED
        XOR     AL,AH           ;TEST IF OK
        JNE     STERR           ;TEST NOT OK
        CMP     AH,0
        JZ      STRT6           ;ZERO PATTERN
        MOV     AL,DL
        STOSB                   ;WRITE NEXT PATTERN
STRT6:  LOOP    STRT5           ;CONTINUE UNTIL ALL OF RAM TEST
        CMP     AH,0
        JE      STRT7           ;RAM TEST COMPLETE
        MOV     AH,AL           ;ROTATE PATTERN
```

```
              XCHG    DH,DL
              CLD                      ;INCREMENT FLAG
              INC     DI               ;POINT TO START BYTE
              JZ      STRT4            ;READ/WRITE FORWARD
              DEC     DI               ;READ/WRITE BACKWARD
              MOV     DX,1             ;00 AND 01 PATTERN
              JMP     STRT3
                                       ;INITIALIZE SEGMENT REGISTER & STACK
STRT7         MOV     AX,DATA
              MOV     DS,AX
              MOVE    AX,EPRM
              MOV     ES,AX
              MOVE    AX,STACK
              MOV     SS,AX
              MOV     SP,OFFSET STACKT
                                       ;INITIALIZE THE CHIP SELECT
                                       ;CONTROLLER
              MOV     DX,LMCSR         ;LOWER MEMORY CHIP SELECT
              MOVE    AX,LMCSD         ;16K at 0 - 3FFFH
              OUT     DX,AX
              MOV     DX,PACSR         ;PERIPHERAL CHIP SELECT
              MOV     AX,PACSD
              OUT     DX,AX
              MOV     DX,MMCSR         ;MID-RANGE MEMORY CHIP SELECT
              MOV     AX,MMCSD         ;16K AT E0000H
              OUT     DX,AX
              MOV     DX,MPCSR         ;MID-RANGE MEMORY SIZE
              MOV     AX,MPCSD
              OUT     DX,AX
                                       ;INITIALIZE 8155 - A
              MOV     DX,A8155CS       ;CONTROLS CLOCK, KEYBOARD, DISPLAY
              MOV     AL,A8155CD       ;PORT A,B,C OUTPUTS, NO TIMER
              OUT     DX,AL
              INC     DX               ;PORT A ADDRESS
              MOV     AL,A8155DA       ;ALL OUTPUTS HIGH
              OUT     DX,AL
              INC     DX               ;PORT B ADDRESS
              OUT     DX,AL
              INC     DX               ;PORT C ADDRESS
              OUT     DX,AL
              INC     DX               ;TIMER LOW COUNT ADDRESS
              MOV     AL,A8155TD       ;NO TIME
              OUT     DX,AL
              INC     DX               ;TIMER HIGH COUNT ADDRESS
                                       ;INITIALIZE 8155 - B
              MOV     DX,B8155CS       ;MONITORS DIP SWITCHES
              MOV     AL,B8155CD       ;PORT A INPUTS, B&C OUTPUTS, NO TIMER
              OUT     DX,AL
              INC     DX               ;PORT A ADDRESS
              MOV     AL,B8155DA       ;ALL INPUTS HIGH
              OUT     DX,AL
              INC     DX               ;PORT B ADDRESS
              OUT     DX,AL            ;ALL OUTPUTS HIGH
              INC     DX               ;PORT C ADDRESS
              OUT     DX,AL
              INC     DX               ;TIMER LOW COUNT ADDRESS
              MOV     AL,B8155TD       ;NO TIME
              OUT     DX,AL
              INC     DX               ;TIMER HIGH COUNT ADDRESS
              OUT     DX,AL
;$$$NO PROGRAM YET$$$                  ;INITIALIZE THE DMA CONTROLLER
;$$$NO PROGRAM YET$$$                  ;INITIALIZE THE TIME CONTROLLER
;$$$NO PROGRAM YET$$$                  ;INITIALIZE THE INTERRUPT CONTROLLER
              CALL    CLKINT           ;INITIALIZE CLOCK
              CALL    DSPINT           ;INITIALIZE DISPLAY
              CALL    JPRTINT          ;INITIALIZE JOURNAL PRINTER
              CALL    CPRTINT          ;INITIALIZE CHECK PRINTER
                                       ;SET UP INTERRUPT VECTOR TABLE
              MOV     ES:NMIPTR,OFFSET NMI
              MOV     ES:NMIPTR+2,CODE
              MOV     ES:TMR0PTR,OFFSET TMR0
              MOV     ES:TMR0PTR+2,CODE
              MOV     ES:DMA0PTR,OFFSET DMA0
              MOV     ES:DMA0PTR+2,CODE
              MOV     ES:DMA1PTR,OFFSET DMA1
              MOV     ES:DMA1PTR+2,CODE
              MOV     ES:INT0PTR,OFFSET INT0
              MOV     ES:INT0PTR+2,CODE
              MOV     ES:CLCKPTR,OFFSET CLCK
              MOV     ES:CLCKPTR+2,CODE
              MOVE    ES:INT2PTR,OFFSET INT2
              MOV     ES:INT2PTR+2,CODE
              MOV     ES:INT3PTR,OFFSET INT0
              MOV     ES:INT3PTR+2,CODE
              MOV     ES:TMR1PTR,OFFSET TMR1
              MOV     ES:TMR1PTR+2,CODE
```

```
            MOV      ES:TMR2PTR,OFFSET TMR2
            MOV      ES:TMR2PTR+2,CODE

CALL     DSPCLR          ;CLEAR DISPLAY
            CLD                      ;FILL KEYBOARD BUFFER WITH SPACES
            MOV      DI,OFFSET KBFR
            MOVE     CX,SKBFR
            MOV      AL,20H
    REP     STOSB
            STI                      ;ENABLE INTERRUPTS
    STRT9:  CALL     RMDCK           ;CHECK RMOD
            CALL     KEYB            ;SCAN KEYBOARD
            CALL     PWRCK           ;CHECK FOR POWER DOWN
            JMP      STRT9           ;LOOP FOREVER
    CODE    ENDS

;POWER ON RESET VECTOR - LOCATED AT OFFFFF0H
    RESET   SEGMENT AT OFFFFH

START OF PROGRAM

MOV      DX,UMCSR        ;UPPER MEMORY CHIP SELECT
            MOV      AX,UMCSD        ;8K AT FE000H
            OUT      DX,AX
            JMP      FAR PTR START
            DB       'RMOO'
    RESET   ENDS
            END

CRO Assembler 03-05-84   Page 1-3

INT VECTOR 3 - NON MASKABLE INTERRUPT - RMOD INTERLOCK

Page

;NMI            PROCEDURE-REENTRANT, NONMASKABLE INTERRUPT
    ;                 ENTRY-INTERRUPT 2
    ;                 EXIT-RMODS=1 - OPEN
                    PUBLIC NMI
    NMI             PROC     NEAR
                    PUSH     BP
                    MOV      BP, SP     ;ESTABLISH BASE POINTER
                    PUSH     BX
                    PUSH     AX
                    PUSHF
                    MOV      BX,OFFSET RMODS  ;WRITE RMOD OPEN
                                                       INDICATOR
                    MOV      AL,01H
                    CALL     WEEPRM     ;WRITE TO EEPROM ONE
                                                       BYTE
                    POPF
                    POP      AX
                    POP      BX
                    POP      BP
                    IRET
    NMI             ENDP
            SUBTTL                INTO - INTERRUPT 0

CRO Assembler 03-05-84
    STERS
            TITLE    RMDCK - CHECK RMOD STATUS REGIS
            STERS
                    PAGE     66,132
            CGROUP  GROUP    CODE, CONST, RESET
            CGROUP  GROUP    INTV, STACK,D ATA
            EGROUP  GROUP    PRM EPRM    SEGMENT  PUBLIC EPRM
                    EXTRN    RMODS:BYTE, CKPRS:BYTE
                    EXTRN    JRPRS:BYTE, KEYBS:BYTE, LCCKC:BYTE
                    EXTRN    LOCK:BYTE
            EPRM    ENDS CODE    SEGMENT PUBLIC CODE
            ASSUME  CS:CGROUP, DS:DGROUP, SS:DGROUP,ES:EGROUP
                    EXTRN         WEEPRM:NEAR ;RMDCK PROCEDURE - CHECK ALL VITAL RMOD STATUS REGISTERS
            ;       IF RMOD WAS OPENED                - RMODS=1 OR
            ;       IF ERROR COUNT EQUALS MAXIMUM     - LOCKC=LOCK
            ;       THEN MONEY ORDER PRINTER IS DISABLED - CKPRS=1AND
```

```
        ;      JOURNAL PRINTER IS DISABLED    - LRPRS=1AND
        ;      KEYBOARD IS LOCKED             - KEYBS=1
               PUBLIC  RMDCK
        RMDCK  PROC    NEAR
               XOR     AL,AL
               TEST    RMODS,01H      ;TEST RMOD FOR OPEN
               JNZ     RMDCK1         ;OPEN
               MOV     AH,LOCKC       ;ERROR COUNT
               CMP     AH,LOCK        ;MAXIMUM ERROR COUNT
               JB      RMDCK2         ;MAXIMUM ERROR COUNT
                                       NOT REACHED
        RMDCK1:INC     AL
        RMDCK2:MOV     BX,OFFSET CKPRS ;MONEY ORDER PRINTER-
                                       0=ENABLE,1=DISABLE
               CALL    WEEPRM
               INC     BX     ;JOURNAL PRINTER - 0=ENABLE,1=DISABLE
               CALL    WEEPRM
               INC     BX     ;KEYBOARD         - 0=ENABLE,1=LOCKED
               CALL    WEEPRM
               RET
        RMDCK  ENDP
        CODE   ENDS
               END

TITLE           KEYB - KEYBOARD MODULE
                Page    66.132

DATA    SEGMENT OUBLIC 'DATA'
        EXTRN   MOVP:BYTE  TOTS:BYTE  DSPR:BYTE   SHFT:BYTE FEEC:BYTE
        EXTRN   KEY:BYTE   KEYP:BYTE  KEYT:BYTE   KEYD:BYTE
        EXTRN   KNDG:BYTE  KCMD:BYTE  KPCMD:BYTE
        EXTRN   KENTM:BYTE KENTP:WORD
        EXTRN   KNBR:BYTE  KFLD:BYTE  KLCK:BYTE
        EXTRN   KDSP:BYTE  KONT:BYTE  KTPE:BYTE
        EXTRN   KLLMT:DWORD           KULMT:DWORD
        EXTRN   KPTR:DWORD KBIN:DWORD KBPTR:DWORD

EXTRN   CNR:BYTE   CMIN:BYTE  CSEC:BYTE
        EXTRN   CSCRTY:WORD
        EXTRN   CSACC:DWORD           CXNBR:DWORD CSCHK:BYTE
        EXTRN   CID:BYTE   CIDL:BYTE
        EXTRN   CCNT:WORD  CAMT:DWORD DFEE:DWORD  CTOT:DWORD
        EXTRN   DFIDT:DWORD
        EXTRN   CMCNT:WORD CMAMT:DWORD
        EXTRN   CVCNT:WORD CVAMT:DWORD
        EXTRN   CTCNT:WORD CTAMT:DWORD
        EXTRN   KBFR:BYTE  DBFR:BYTE  SCRTCH:BYTE
        DATA    ENDS

EPRM    SEGMENT PUBLIC 'EPRM'
        EXTRN   SCRTY:WORD
        EXTRN   STACC:WORD STSTE:BYTE STSUB:BYTE  STDIV:WORD STSTR:WORD
        EXTRN   MONTH:BYTE DATE:BYTE  YEAR:BYTE
        EXTRN   PHONE:BYTE
        EXTRN   USE:BYTE              ID:BYTE
        EXTRN   FEELMT:DWORD          FEEAMT:DWORD
        EXTRN   MCNTC:WORD            MCNTM:WORD
        EXTRN   MAMTC:DWORD           MAMTM:DWORD
        EXTRN   VCNTC:WORD            VCNTM:WORD
        EXTRN   VAMTC:DWORD           VAMTM:DWORD
        EXTRN   BLANKS:BYTE           TRANS:BYTE  LOOK:BYTE
        EXTRN   BSACC1:WORD BSNBS1:DWORD          BSCHK1:BYTE
        EXTRN   ESACC1:WORD ESNBR1:DWORD          ESCHK1:BYTE
        EXTRN   BSACC2:WORD BSNBR2:DWORD          BSCHK2:BYTE
        EXTRN   ESACC2:WORD ESNBR2:DWORD          ESCHK2:BYTE
        EXTRN   RMODS:BYTE  MODMS:BYTE            CKPRS:BYTE
        EXTRN   JRPRS:BYTE  KEYBS:BYTE            LOCKS:BYTE
        EPRM    ENDS

CODE    SEGMENT PUBLIC 'CODE'
        EXTRN   PWRON:NEAR
        EXTRN   WEEPRM:NEAR
        EXTRN   TRNS:NEAR
        EXTRN   DISP:NEAR   JPRT:NEAR  CPRT:NEAR
        EXTRN   ASCBN:NEAR  BNASC:NEAR
        EXTRN   DPCMP:NEAR  DPADD:NEAR DPSUB:NEAR DPMUL:NEAR DPDIV:NEAR
        CODE    ENDS

DGROUP  GROUP   CODE, CONST, RESET
                DGROUP  GROUP   INIV, STACK DATA
```

CODE SEGMENT PUP `C `CODE`

RO Assembler 03-06-84

ASSUME CS:CGROUP, DS:GROUP, SS:DGROUP, ES:EGROUP

;KEYBOARD CONSTANTS

```
NID       EQU   20        ;NUMBER OF IDENTIFICATION CODES
NFEE      EQU   20        ;NUMBER OF FEES
NTR       EQU   16        ;NUMBER OF TRANSACTIONS PER
                          CUSTOMER/VENDOR
SKBFR     EQR   16        ;SIZE OF KEYBOARD BUFFER
SDBFR     EQU   16        ;SIZE OF DISOLAY BUFFER
KBDCS     EQU   300H      ;KEYBOARD COMMAND/STATUS ADDRESS
KBDCD     EQU   00DH      ;PORT A & C OUTPUT, B INPUT
KBDRS     EQU   0FBH      ;ROW 1 SELECT
KBDRM     EQU   00FH      ;READ MASK
KNKEY     EQU   24        ;NUMBER OF KEYS
KNROW     EQU   6         ;NUMBER OR ROWS
KNCOL     EQU   4         ;NUMBER OF COLUMNS
KDBNC     EQU   4         ;DEBOUNCE CONSTANT
KBYTE     EQU   1         ;BYTE ENTRY
KWORD     EQU   2         ;WORD ENTRY
KDWRD     EQU   3         ;DWORD ENTRY
KREAL     EQU   4         ;REAL ENTRY
KALPHA    EQU   5         ;ALPHA ENTRY
KEY0      EQU   00H       ;0
KEY1      EQU   01H       ;1
KEY2      EQU   02H       ;2
KEY3      EQU   03H       ;3
KEY4      EQU   04H       ;4
KEY5      EQU   05H       ;5
KEY6      EQU   06H       ;6
KEY7      EQU   07H       ;7
KEY8      EQU   08H       ;8
KEY9      EQU   09H       ;9
KEYEN     EQU   0AH       ;ENTER
KEVVD     EQU   0BH       ;VOID
KEYST     EQU   0CH       ;START
KEYNF     EQU   0DH       ;NO FEE
KEYID     EQU   0EH       ;ID
KEYMO     EQU   0FH       ;MONEY ORDER
KEYTX     EQU   10H       ;TRANSMIT
KEYDF     EQU   11H       ;DEFINE
KEYVP     EQU   12H       ;VENDOR PAYMENT
KEYTO     EQU   13H       ;TOTAL
KEYLD     EQU   14H       ;LOAD
KEYDY     EQU   15H       ;DAY/SHIFT
KEYDS     EQU   16H       ;DISPLAY
KEYBR     EQU   17H       ;PRINT
KEYDATA   DB    KEYLD     ;KEY CODE TABLE
          DB    KEYDY
          DB    KEYDS
          D     KEYPR
          DB    KEYTX
          DB    KEYDF
          DB    KEYBP
          DB    KEYTO
          DB    KEYST
          DB    KEYNF
          DB    KEYID
          DB    KEYMO
          DB    KEY6
          DB    KEY3
          DB    KEYEN
```

CRO Assembler 03-06-84

```
          DB    KEY8
          DB    KEY5
          DB    KEY2
          DB    KEY0
          DB    KEY7
          DB    KEY4
          DB    KEY1
          DB    KEYVD
KEYJT     DW    KENT      ;KEYBOARD JUMP TABLE
          DW    KVOID
          DW    KSTRT
          DW    KNFEE
          DW    KID
          DW    KMO
          DW    KTRNS
```

```
                DW      KDEFN
                DW      KVP
                DW      KTOTL
                DW      KLOAD
                DW      KSHFT
                DW      KDISP
                DW      KPRNT
;DATA ENTRY AND DISPLAY TABLES
;NUMBER OF DATA ITEMS TO BE ENTERED
;16 CHARACTER DISPLAY
;NUMBER OF POSSIBLE ENTRIES PER DATA ITEM
;NUMBER OF FIELDS
;NUMBER OF ERRONEOUS ENTRIES BEFORE RMOD LOCKS
;DISPLAY START OF ENTRY - 0=NO DISPLAY
;NUMBER OF CHARACTERS PER DISPLAY - 0=NONE ALLOWED
;TYPE OF DATA - 1=BYTE, 2=WORD, 3=DWORD, 4=REAL, 5=ALPHA
;LOWER LIMIT - 0=NO LIMIT CHECK, FFFFFFFF=CHECK AGAINST ARRAY
        IN UPPER LIMIT
;UPPER LIMIT
;DATA STORAGE POINTER
KSTRTN   EQU    2                       ;START OF DAY KEYBOARD DATA
KSTRTD   DB     'ID              ',20,1,5

DB      14,3,1
                DD      OFFFFFFFFH,ID
                DD      CIDL
                DB      'BEG#            ',1,3,0

DB      6,3,2
                DD      OFFFFFFFFH,BSACC1
                DD      CSACC
                DB      9,6,3
                DD      OFFFFFFFFH,DBNBR1
                DD      CSNBR
                DB      16,12,1
                DD      OFFFFFFFFH,BSCHK1
                DD      CSCHK
                DD      OFFFFFFFFH,SCRTY
                DD      CSCRTY     DB
'DIAL TELELPHONE #',0,0,0

DB      0,0,0
                DD      0,0

DD      TRNS
                DB      'DISCONNECT RMOD ',0,0,0

DB      0,0,0
                DD      0,0

DD      0
EFNN     EQU    19                      ;DEFINE KEYBOARD DATA-ENTERED BY
                                         MANAGER
EFND     DB     'SECURITY#       ',1,1,0

DB      0,5,2
                DD      0,0

DD      SCRTY
                DB      'ST              ',1,5,0

DB      3,3,2
                DD      0,0

DD      STACC
                DB      6,2,1
                DD      0,0

DD      STSTE
                DB      8,2,1
                DD      0,0

DD      STSUB
                DB      10,3,2
                DD      0,0

DD      STDIV
                DB      13,4,2
                DD      0,0

DD      STSTR
                DB      'DATE     /  / ',1,3,0
                DD      MONTH
                DB      12,2,
                DD      1,31
```

0 Assembler 03-06666-84

```
        DD      DAY
        DB      15,2,1
        DD      0,0

DD      YEAR
        DB      'TIME       :   :  ',1,3,0

DB      9,2,1
        DD      0,24

DD      CHR
        DB      12,2,1
        DD      0,59

DD      CMIN
        DB      15,2,1
        DD      0,59

DD      CSEC
        DB      'PHNE-         ',1,1,0

DB      6,11,5
        DD      0,0

DD      PHONE
        DB      'ID USE       ',1,1,0

DB      16,1,1
        DD      0,2

DD      USE
        DB      'ID           ',20,1,0

DB      14,3,1
        DD      0,255

DD      ID
        DB      'FE           ',20,2,0

DB      2,3,4
        DD      0,99999999

DD      FEELMT
        DB      12,4,4
        DB      12,5,2
        DD      0,0

DD      MCNTC
        DB      'MCH MO#      ',0,1,0

DB      12,5,2
        DD      0,0

DD      MCNTM
        DB      'CST MO$      ',0,1,0

DB      8,8,4
        DD      0,0

DD      MAMTC
        DB      'MCH MO$      ',0,1,0

DB      8,8,4
        DD      0,0

DD      MAMTM
        DB      'VND CK#      ',0,1,0

DB      12,5,2
        DD      0,0

DD      VCNTC
        DB      'MCH CK#      ',0,1,0

DB      12,5,2
        DD      0,0
```

```
            DD      VCNTM
            DB      'VND CKS       ',0,1,0

DB      8,8,4
            DD      0,0

DD      MANTC
            DB      'MCH CKS       ',0,1,0
            DD      VAMT
```

RO Assembler 03-06-84

```
            DB      'WARN # BLANKS  ',0,1,0

DB      15,2,1

DD      0,0
            DB      'WARN # TRANS   ',0,1,0

DB      15,2,1
            DD      0,0

DD      TRANS
            DB      'LOCK # ERRORS  ',0,1,0

DB      15,2,1
            DD      0,0

DD      LOCK
KLOADN      EQU     3
KLOADD      DB      'SECURITY #     ',1,1,5

DB      0,5,2
            DD      0FFFFFFFFH,SECRTY
            DD      CSCRTY
            DB      'BEG#           ',1,3,0

DB      6,3,2
            D       0FFFFFFFFH,STACC
            DD      BSACC2
            DB      9,6,3
            DD      0,0

DD      BSNBRS2
            DB      16,1,1
            DD      0,0

DD      BSCHK2
            DB      'END#           ',1,3,0

DB      6,3,2
            DD      0FFFFFFFFH,STACC
            DD      EACC2
            DB      9,6,3
            DD      0,0

KEYBOARD MONITOR PROCEDURE

PAGE
;KEYBOARD MONITOR PROCEDURE
            PUBLIC  KEYB
KEYB        PROC    NEAR
            MOV     AL,KEYBS        ;$$$SECURITY CHECK$$$
            XOR     AL,AL
            JNZ     KEYB0           ;$$$KEYBOARD LOCKED$$$
            CALL    KEYSC           ;SCAN KEYBOARD FOR KEY
                                    ; DEPRESSED
            CMP     AL,KNKEY
            JL      KEYB1
KEYB0:      RET                     ;NO KEY OR NON-EXIST KEY
KEYB1:      XOR     CX,CX
            CMP     AL,10
            JL      KNMBR           ;NUMBER 0-9
            XCHG    KCMD,AL         ;ROTATE COMMANDS
            MOV     KPCMD,AL        ;SAVE PREVIOUS COMMAND
            SUB     AL,10
            MOV     CL,AL
            PUSH    CX              ;SAVE JUMP TABLE INDEX
            MOV     CL,KCNT         ;NUMBER OF DIGITS ALLOWED
            CMP     KNDG,0          ;NUMBER OF DIGITS ENTERED
            JZ      KEYB4           ;NO DATA ENTERED
            MOV     DI,KPTR         ;OFFSET OF DATA STORAGE IF ANY
            MOV     SI,OFSET KBIN   ;TEMPORARY BINARY STORAGE
```

```
            MOV     BX,OFFSET SCRTCH
            MOV     AX,KBPTR        ;OFFSET OF DATA ENTERED
            CMP     KTPE,KALPHA     ;CHECK DATA TYPE
            JE      KEYB2           ;ALPHA
            PUSH    AX              ;SAVE KEYBOARD BUFFER ADDRESS
            PUSH    SI
            PUSH    BX
            PUSH    CX
            CALL    ASCBN           ;CONVERT TO BINARY
            PUSH    SI              ;POINTER TO CONVERTED BINARY
                                    NUMBER
            MOV     AX,OFFSET KLLMT
            PUSH    AX              ;LOWER LIMIT
            CALL    DPCMP           ;COMPARE
            SAL     AX,1
            JC      KEYB5           ;ERROR-NUMBER/LOWER LIMIT
            MOV     AX,OFFSET KULMT
            PUSH    AX              ;UPPER LIMIT
            PUSH    SI              ;CONVERTED BINARY NUMBER
            CALL    DPCMP           ;COMPARE
            SAL     AX,1
            JC      KEYB5           ;ERROR-UPPER LIMIT/NUMBER
            MOV     CL,KTPE
            CMP     CL,KDWRD
            JNE     KEYB2
            INC     SX              ;ADJUST DWORD COUNT
KEYB2:      MOV     AX,DS           ;TRANSFER DATA ENTERED
            CMP     KPTR+2,AX
            JE      KEYB3           ;DESTINATION=EE PROM
            MOV     BX,KPTR
KEYB2A      LODSB
            CALL    WEEPRM          ;DESTINATION=EE PROM
            INC     BX
            LOOP    KEYB2A
            JE      KEYB4           ;NO TRANSFER, LEAVE IN KF
REP         MOVSB

RO Assembler 03-006-44

KEYBOARD MONITOR PROCEDURE

KEYB4:      POP     BX              ;RETRIEVE JUMP TABLE INDEX
            SHL     BX,1            ;COMPUTE JUMP ENTRY
            JMP     KEYJT [BX]      ;PROCESS KEY
KEYB5:      POP     BX
            CALL    KERR
            RET
KNMBR:,     ADD     AL,30H          ;CONVERT TO ASCII
            CLD
            MOV     SI,OFFSET KBFR+1
            MOV     DI,OFFSET KBFRR
MOV         CX,SKBFR-1
REP         MOVSB                   ;ROTATE KBFR TO LEFT
            STOSB                   ;ADD NEW CHARACTER TO RIGHT
            INC     KNDG            ;DIGIT COUNT
            CMP     KDSP,0          ;CHECK FOR DISPLAY
            JZ      KNMBR3          ;NO DISPLAY ALLOWED
            MOV     DI,OFFSET DBFR-1
            XOR     CH,CH
            MOV     CL,KDSP
            ADD     DI,CX
            MOV     SI,OFFSET KBFR+SKBFR
            MOV     CL,KCNT
            SUB     SI,CX
            MOV     KBPTR,SI        ;SAVE KBFR OFFSET
            PUSH    DI              ;SAVE START OF DISPLAY
            PUSH    CX              ;SAVE NUMBER OF CHARACTERS IN
                                    DISPLAY
            MOV     BL,KTPE         ;TYPE OF ENTRY BEING PROCESSED
            CMP     BL,KREAL
            JNE     KNMBR1
            POP     CX
            INC     CX              ;ADD DECIMAL POINT TO COUNT
            PUSH    CX
            SUB     CX,3            ;REAL ENTRY
KNMBR1:
REP         MOVSB                   ;MOVE KBFR TO DBFR
            CMP     BL,KREAL        ;CHECK FOR REAL ENTRY
            JNE     KNMBR2
            MOV     AL,'.'          ;REAL ENTRY
            STOSB
            MOV     CL,2            ;MOVE FRACTION
REP         MOVSB
KNMBR2:     MOV     AH,DKSP         ;START OF MESSAGE (1-16)
            MOV     AL,05H          ;CURSOR LINE, ON
            PUSH    AX
```

```
            CALL      DISP
KNMBR3:     RET
KENTR:      NGP                         ;ENTER KEY - $$$NO PROGRAM$$$
KVOID:      MOV       AH,MOVP           ;VOID KEY
            MOV       AL,TOTS           ;TOTAL STATUS
            CMP       AH,1
            JE        KOID1             ;MONEY ORDER VOID
            CMP       AH,2
            JE        KVPOID2           ;VENDOR PAYMENT VOID
            CALL      KERR              ;ERROR-CLEAR ENTRY & BEEP
            RET

;CAMT,CFEE INDEX

MOV       CX,CCNT           ;# OF MO/VP ENTERED
            CMP       AL,0
            JNE       KVOID4            ;TOTAL KEY DEPRESSED, VOID ALL
            MOV       AL,4              ;VOID LAST ENTRY
            DEC       CL
            MUL       CL
            MOV       BX,AX
            MOV       CL,1
KVOID4:     PUSH      CX                ;# OF ENTRIES TO BE VOIDED
KVOID5:     DEC       CCN               ;REDUCE COUNT
            DEC       CVCNT
            CMP       TOTS,1
            JNZ       KVOID6
            DEC       CTCNT             ;REDUCE TOTAL TRANSACTIONS
KVOID6:     LOOP      KVOID5
            POP       CX
            PUSH      CX
            PUSH      DI                ;SAVE CMAMT/CVAMT OFFSET
KVOID7:     MOV       SI,OFFSET CAMT
            ADD       SI,BX
            MOV       DI,OFFSET CTOT
            PUSH      SI
            PUSH      DI
            CALL      DPSUB             ;CTOT=CTOT-MO/VP
            CMP       MOVP,1
            JNE       KVOID9
            PUSH      SI                ;REDUCE FEES
            CMP       TOTS,0
            JE        KVOID8
            MOV       SI,OFFSET CFEE    ;SUBTRACT FEE FROM CTOT
            ADD       SI,CX
            PUSH      SI
            PUSH      DI
            CALL      DPSUB             ;CTOT=CTOT-CFEE
KVOID8:     XOR       AX,AX             ;ZERO FEE
            MOV       [SI],AX
            MOV       [SI+2],AX
            POP       SI
KVOID9:     POP       DI
            POP       SI
            PUSH      DI
            CALL      DPSBU             ;CMAMT/CVAMT=CMAMT/CVAMT-MO/VP
            POSH      DI
            CMP       TOTS,1
            JNZ       KVOID10
            MOV       DI,OFFSET CTAMT   ;REDUCE TOTAL AMOUNT
            PUSH      SI
            PUSH      DI
            CALL      DPSUB
KVOID10:    POP       DI
            XOR       AX,AX
            MOV       [SI],AX           ;ZERO CAMT
            MOV       [SI+2],AX
            INC       BX
            INC       BX
            CALL      PWRON             ;POWER ON
            RET
KSTRT1:     MOV       AL,KSTRTN         ;START DATA
            MOV       SI,OFFSET KSTRTD
            CALL      KINIT             ;INITIALIZE KEYBOARD AND
                                        ;DISPLAY VARIABLES
            RET
KNFEE:      MOV       FEEC,1            ;NO FEE KEY - FECC=1
            RET
KID:        MOV       SI,OFFSET KBIN    ;ID KEY
            LODSB
            MOV       CID,AL
            PUSH      ES                ;CHECK FOR VALID ID
            MOV       AX,EPRM
```

```
            MOV     DI,OFFSET ID        ;EEPROM ADDRESS
            MOV     CX,NID              ;NUMBER OF IDS
            REPNE   SCASB
            POP     ES
            JB      KID1
            MOV     CID,0               ;ZERO CURRENT ID
            CALL    KERR                ;ERROR-WIPE OUT ENTRY AND
                                        BEEP
KID1:       RET                         ;MATCH FOUND
KMO:        MOV     SI,OFFSET KBIN      ;MONEY ORDER KEY
            MOV     DI,OFFSET CTOT
            PUSH    SI
            PUSH    DI
            CALL    DPADD               ;CTOT=CMAMT+AMT ENTERED
            MOV     DI,OFFSET CMAMT
            PUSH    SI
            PUSH    DI
            CALL    DPADD               ;CMAMT=CMAMT+AMT ENTERED
            PUSH    ES
            MOV     AX,EPRM
            MOV     ES,AX
            MOV     DI,OFFSET MONTC     ;EEPROM ADDRESS
            MOV     AX,CCNT
            CMP     AX,NTR              ;CHECK NUMBERS
            JGE     KMOE                ;MONEY ORDERS EXCEEDED PER
                                        SYSTEM
            CMP     AX,ES:WORD PTR[DI]
            JGE     KMOE                ;MONEY ORDERS EXCEEDED PER
                                        MACHINE
            MOV     SI,OFFSET CTOT      ;CHECK AMOUNT PER CUSTOMER
            ADD     DI,2
            PUSH    SI
            PUSH    DI
            CALL    DPCMP               ;COMPARE TWO DOUBLE
                                        PRECISION NUMBERS
            CMP     AL,1
            JE      KMO4                ;CTOT MAX AMT PER CUSTOMER
            MOV     SI,OFFSET CMAMT     ;CHEC AMOUNTS PER MACHINE
            ADD     DI,4
            PUSH    SI
            PUSH    DI
            CALL    DPCMP               ;COMPARE TWO DOUBLE
                                        PRECISION NUMBERS
            CMP     AL,1
            CALL    KERR                ;ERROR - CLEAR ENTRY & BEEP

RO Assembler 03-06-84           Page 1-13
KEYBOARD MONITOR PROCEDURE

KMO0:       MOV     MOVP,1              ;MO/VP INDICATOR
            INC     CONT
            INC     CMONT
            MOV     AL,4
            MUL     BL
            MOV     BX,AX               ;CAMT & CFEE INDEX
            MOV     AX,KBIN             ;LOW BYTES OF MO
            MOV     CAMT[BX],AX
            MOV     AX,KBIN+2           ;HIGH BYTES OF MO
            MOV     CAMT[BX],AX
            MOV     AL,FEEC             ;CHECK IF FEE IS TO BE
                                        COMPUTED
            CMP     AL,0
            JE      KMO3                ;NO FEE
            PUSH    ES
            MOV     AX,EPRM
            MOV     ES,AX
            MOV     SI,OFFSET KBIN      ;FIND FEE
            MOV     DI,OFFSET FEELMT-9
            MOV     CX,NFEE
KMO1:       ADD     DI,8                ;$$$ORDER CHANGED$$$
            PUSH    SI
            PSUH    DI                  ;$$$WRONG SEGMENT$$$
            CALL    DPCMP               ;COMPARE TWO DOUBLE
                                        PRECISION NUMBERS
            CMP     AX,1
            JNE     KMO2                ;FEE FOUND-MONEY ORDER
                                        $<=$BREAKPOINT
            LOOP    KMO1                ;NEXT FEE
KMO2:       ADD     DI,4                ;FEE ADDRESS
            MOV     AX,ES:WORD PTR[DI]
            MOV     CFEE[BX],AX
            ADD     DI,2
            MOV     AX,ES:WORD PTR[DI]
```

```
                MOV     CFEE+20BX1,AX
                POP     ES
KNO3:           RET
KNO4:           POP     ES                      ;AMOUNTS EXCEEDED-SUBTRACT
                                                 LAST AMOUNTS
                MOV     SI,OFFSET KBIN
                MOV     DI,OFFSET CTOT
                PUSH    SI
                PUSH    DI
                PUSH    SI
                CALL    DPSUB                   ;CTOT=CMAMT--AMT ENTERED
                PUSH    ES
                CALL    DPSUB                   ;CMAMT=CMAMT-AMT ENTERED
                PUSH    ES
                JMP     KNOE                    ;ERROR
KTRNS:          MOV     AL,KTRNSN               ;TRANSMIT KEY
                MOV     SI,OFFSET KTRNSD
                CALL    KINIT                   ;INITIALIZE KEYBOARD &
                                                 DISPLAY VARIABLES
                RET
KDEFN:          MOV     AL,KDEFNN               ;DEFINE KEY
                MOV     SI,OFFSET KDEFND
                CAL     KINIT                   ;INITIALIZE KEYBOARD &
                                                 DISPLAY VARIABLES
                STOSW
                MOV     AL,MOVP
                JE      KTOTL6                  ;DISPLAY OR PRINT TOTALS
                CMP     AL,2
                JE      KTOTL3                  ;VENDOR PAYMENT TOTAL
                CMP     AL,1
                JE      KTOTL1                  ;MONEY ORDER TOTAL
                CALL    KERR
                RET
KTOTL1:         MOV     CX,CONT                 ;MONEY ORDER TOTAL
                MOV     SI,OFFSET CFEE-4
                MOV     DI,OFFSET CTOT
KTOTL2:         ADD     SI,4                    ;FEE ADDRESS
                PUSH    SI
                PUSH    DI
                CALL    DPADD                   ;ADD UP ALL FEES
                LOOP    KTOTL2
KTOTL3:         MOV     CX,CCNT                 ;SUM TOTAL TRANSACTIONS
                AD      CTCNT,CX
                MOV     SI,OFFSET CAMT-4
                MOV     DI,OFFSET CTOT
KTOTL4:         ADD     SI,4
                PUSH    SI
                PUSH    DI
                CALL    DPADD
                LOOP    KTOTL4
                PUSH    DI
                MOV     SI,OFFSET CTAMT
                PUSH    SI
                CALL    DPADD                   ;SUM MACHINE TOTAL
                MOV     SI,OFFSET NOTMSG        ;NO TOT
                CMP     MOVP,1
                JE      KTOTL5
                MOV     SI,OFFSET VPTMSG        ;VP TOT
KTOTL5:         MOV     DI,OFFSET DBFR
                PUSH    DI                      ;DBFR ADDRESS FOR DISPLAY
                MOV     CX,7
REP             MOVS    ES:BYTE PTR[DI],CS:[SI]
                MOV     SI,OFFSET CTOT          ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC                   ;CONVERT TO ASCII
                MOV     AX,SDBFR
                PUSH    AX
                MOV     AX,120H                 ;BLINKING DISPLAY, NO CURSOR
                PUSH    AX
                CALL    DISP                    ;DISPLAY
                RET
KTOTL6:         NOR     ;TOTAL DISPLAY/REPORTS-$$$NO PROGRAM$$$

KSHFT:          MOV     SHFT,1                  ;DAY/SHIFT KEY
                RET
KDISP:          MOV     DSPR,1                  ;DISPLAY KEY - DSPR=1
                RET
KPRNT:          MOV     DSPR,2                  ;PRINT KEY - DSPR=2
```

```
            MOV     AL,MOVP
            CMP     AL,0
            JNZ     KPRNT1          ;MO/VP PRINT
            RET
KPRNT1:     MOV     AL,CKPRS        ;$$$ SECURITY CHECK $$$
            XOR     AL,AL
            JZ      KPRNT2          ;OK TO PRINT MONEY
                                    ORDERS/VENDOR PAYMENTS
            RET                     ;PRINTER DISABLED - IGNORE
                                    PRINT COMMAND
KPRNT2:     NOP                     ;PRINT CHECK - $$$ NO PROGRAM
                                    $$$
KEYB        ENDP
SUBTTL              KEYBOARD INITIALIZATION PROCEDURE
```

PAGE 66,132
NAME            (illegible)

```
;*****************************************************
;   ***   PRINTER DRIVER FOR SMSB. THIS PROGRAM ACCEPTS STRING   ***
;   ***   DATA AND TRANSFORMS IT INTO A LIST OF "CELL SPECS"     ***
;   ***   WHICH ARE SORTED AND PROCESSED TO GENERATE A LINE AT A ***
;   ***   TIME OF PIXEL DATA TO DRIVE THE FOUR PRINT SOLENOIDS   ***
;   ***   OF A _____ DOT MATRIX PRINTER                      ***
;   ***   THE ALGORITHM IS EXPLAINED IN A SEPARATE DOCUMENT      ***
;   ***   TITLED "_____"                                     ***
;*****************************************************
```

| Label | Directive | Operand |
|---|---|---|
| STACK | SEGMENT | PARA STACK 'STACK' |
| STACK_BOTTOM | LABEL | WORD |
|  | ORG | OFFSET $+01FEH |
| STACK_TOP | LABEL | WORD |
| STACK | ENDS |  |
| DATA | SEGMENT | PARA MEMORY 'DATA' |
| NEXT_CELL | LABEL | WORD |
|  | ORG | OFFSET $+2 |
| TOTAL_CELLS | LABEL | WORD |
|  | ORG | OFFSET $+2 |
| XCOORD | LABEL | WORD |
|  | ORG | OFFSET $+2 |
| YCOORD | LABEL | WORD |
|  | ORG | OFFSET $+2 |
| FONT | LABEL | BYTE |
|  | ORG | OFFSET $+1 |
| DIRECT | LABEL | BYTE |
|  | ORG | OFFSET $+1 |
| WIDTH | LABEL | BYTE |
|  | ORG | OFFSET $+1 |
| HEIGHT | LABEL | BYTE |
|  | ORG | OFFSET $+1 |
| HSPACE | LABEL | BYTE |
|  | ORG | OFFSET $+1 |
| VSPACE | LABEL | BYTE |
|  | ORG | OFFSET $+1 |
| IPT_OFFS | LABEL | WORD |
|  | ORG | OFFSET $+2 |
| HORIZ | LABEL | WORD |
|  | ORG | OFFSET $+2 |
| VERT | LABEL | WORD |
|  | ORG | OFFSET $+2 |
| CSPECS_START | LABEL | WORD |
|  | ORG | OFFSET $+2 |
| ACTIVE_CELL_TABLE | LABEL | WORD |
|  | ORG | OFFSET $+(2*2*65) |
| ACTIVE_LIST | LABEL | WORD |
|  | ORG | OFFSET $+2 |
| THIS_ENT | LABEL | WORD |
|  | ORG | OFFSET $+2 |
| NEXT_ENT | LABEL | WORD |
|  | ORG | OFFSET $+2 |
| FREE_LIST | LABEL | WORD |
|  | ORG | OFFSET $+2 |

```
BACK            LABEL       WORD
                ORG         OFFSET $+2
FWD             LABEL       WORD
                ORG         OFFSET $+2
NUMBER_ACTIVE   LABEL       BYTE
                ORG         OFFSET $+1
SWAPPED         LABEL       BYTE
                ORG         OFFSET $+1

;       THIS IS THE OUTPUT LINE BUFFER FOR SOLENOID DATA

BUFF            LABEL       BYTE        ; ROOM FOR 16 BYTES
                ORG         OFFSET $+16 ; LAST 2 FOR OVERFLOW

BIT             LABEL       BYTE        ; HOLDS POSITION IN SCANLINE
                ORG         OFFSET $+1
SCANLINE        LABEL       WORD        ; HOLDS CURRENT SCANLINE
                ORG         OFFSET $+2
PR_SHADOW       LABEL       BYTE
                ORG         OFFSET $+1
SOL             LABEL       BYTE        ; HOLDS VAL OF CURRENT
                ORG         OFFSET $+1  ; SOLENOID
INSERTED        LABEL       WORD        ; NUMBER OF COPIES WHICH
                ORG         OFFSET $+2  ; HAVE BEEN MADE ACTIVE
NXT2CME         LABEL       WORD        ; OFFSET OF NXT COPIES
                ORG         OFFSET $+2  ; TO BXXXXX

;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT      LABEL       BYTE
                ORG         OFFSET $+1

;       TEST DATA- TO BE REMOVED AFTER DEBUGGING IS DONE
;       THIS SPECIFIES 3 STRINGS TO BE PRINTED

STRING_LIST     DB          3               ;3 STRING DESCRIPTORS
                DW          OFFSET STRING1
                DW          OFFSET STRING2
                DW          OFFSET STRING3

STRING1         DW          4               ;X COORDINATE
                DW          0               ;Y COORDINATE
                DB          AFONT           ;STANDARD FONT
                DB          DOWN            ;CHECK ORIENTATION
                DB          3               ;CHARACTER COUNT
                DB          'ABC'           ;THE STRING

STRING2         DW          0               ;X COORDINATE
                DW          0               ;Y COORDINATE
                DB          AFONT           ;STANDARD FONT
                DB          RIGHT           ;RECEIPT ORIENTATION
                DB          4               ;NUMBER OF CHARS
                DB          'TX_J'          ;THE STRING

STRING3         DW          25              ;X COORDINATE
                DW          10              ;Y COORDINATE
                DB          AFONT           ;STANDARD FONT
                DB          LEFT            ;BACKWARDS DIRECTION
                DB          2               ;CHAR COUNT
                DB          'HI'            ;THIRD STRING

FREE_SPACE      LABEL       WORD            ;SHOULD BE ENOUGH SPACE
                ORG         $+(50*8)        ;FOR 50 CELL SPECS
END_DATA        LABEL       WORD
DATA            ENDS
```

;**********************************************************
;EQUATES
;**********************************************************

```
MAX_ACTIVE_CELLS       EQU        64
SIZE_OF_ACT            EQU        6
CSPEC_SIZE_IN_BYTES    EQU        8

RIGHT                  EQU        0
LEFT                   EQU        1
UP                     EQU        2
DOWN                   EQU        3

;OFFSETS WITHIN AN ACTIVE CELL TABLE ENTRY.

ACT_CSPEC_INDEX        EQU        0
ACT_BACK_PTR           EQU        2
ACT_FWD_PTR            EQU        4

;OFFSETS WITHIN A CELL SPEC

CSPEC_SCANLINE         EQU        0
CSPEC_RGHOFFS          EQU        2
CSPEC_WIDTH            EQU        4
CSPEC_HEIGHT           EQU        5
CSPEC_XBYTEOFFS        EQU        6
CSPEC_XBITOFFS         EQU        7

;OFFSETS WITHIN A FONT DESCRIPTOR

FDESC_WIDTH            EQU        0
FDESC_HEIGHT           EQU        1
FDESC_HSPACE           EQU        2
FDESC_VSPACE           EQU        3
FDESC_LFTOFFS          EQU        4

;OFFSETS WITHIN A STRING DESCRIPTOR

STDESC_XCOORD          EQU        0
STDESC_YCOORD          EQU        2
STDESC_FONT            EQU        4
STDESC_DIRECT          EQU        5
STDESC_COUNT           EQU        6
STDESC_CHARS           EQU        7

MAX_SCANS              EQU        700      ;MAX SCANLINES PER MONEY ORDR
BITS_PER_SCAN          EQU        240      ;WIDTH OF ONE SCANLINE IN DOTS

;EQUATES USED WITH PRINT SHADOW REGISTER   PR_SHADOW

SOL1                   EQU        01H
SOL2                   EQU        02H
SOL3                   EQU        04H
SOL4                   EQU        08H
NOT_SOLENOIDS          EQU        0F0H
MTRORV                 EQU        010H
NOT_MTRORV             EQU        0EFH
MTRSTP                 EQU        020H
NOT_MTRSTP             EQU        0DFH
CLAMP_ON               EQU        080H
CLAMP_OFF              EQU        07FH

AFONT                  EQU        0
BFONT                  EQU        1

CODE                   SEGMENT    WORD    PUBLIC 'CODE'

ASSUME     CS:CODE
            ASSUME     DS:DATA
            ASSUME     SS:STACK

;***************************************************************
; DRIVER ROUTINE :    THIS IS FOR DEBUGGING-SHOULD COME OUT LATER
;***************************************************************

TEST_STARTS:           MOV        AX,DATA
                       MOV        DS,AX
```

```
              MOV        AX,STACK          ;SET UP STACK SEG
              MOV        SS,AX
              MOV        SP,OFFSET STACK_TOP ;SET UP STK PTR

MOV        DX,OFFSET FREE_SPACE
              MOV        BX,OFFSET STRING_LIST
              CALL       PRNTR
TEST_DONE:    JMP        TEST_DONE
```

;**************************************************
;END OF DEBUGGING CODE
;**************************************************

;**************************************************
;
; THIS IS THE MAIN ENTRY POINT FOR THE WHOLE PRINTER DRIVER
; PRNTR EXPECTS TWO PARAMETERS:
;
;       1. THE OFFSET OF THE STRING LIST TABLE SHOULD BE IN BX reg
;
;       2. THE OFFSET OF UNRESTRICTED WORKSPACE ABOVE ALL STRINGS
;          AND OTHER DATA SHOULD BE IN DX reg
;
;**************************************************

```
PRNTR:        PUSHA     ***** 80186 INST. ;SAVE ALL REGISTERS
                                          ; REPLACED BY THE FOLLOWING
              PUSH       AX
              PUSH       BX
              PUSH       CX
              PUSH       DX
              PUSH       DS
              PUSH       ES
              PUSH       SS
              PUSH       DI
              PUSH       SI
              PUSH       BP

MOV        AX,DATA           ;SET UP SEGMENT REGISTER
              MOV        DS,AX
```

;       SET THE OFFSET OF UNRESTRICTED WORKSPACE IN WHICH WE MAY
;       BUILD THE TABLES. CALLER SHOULD SUPPLY THIS IN DX REGISTER

```
              MOV        NEXT_CELL,DX      ;OFFSET OF FREE AREA IN DATA SEGMENT
                                           ; FOR TABLES
              MOV        TOTAL_CELLS,0     ;COUNTER FOR CELL SPECS
              MOV        CSPECS_START,DX   ;SAVE ORIGIN OF CELL SPEC TABLE.

SUB        DX,DX
```

; BX HOLDS OFFSET IN DATA SEGMENT OF STRING LIST

```
              MOV        CL,[BX]           ;GET NUMBER OF STRINGS TO PROCESS
              INC        BX                ;BX HOLDS OFFSET OF WORD HOLDING
                                           ;OFFSET OF FIRST STRING IN LIST
```
;       CHECK FOR ZERO STRINGS
```
              CMP        CL,0
              JG         DO_A_STRING
              JMP        LISTS_DONE
```

;**************************************************
; PROCESS EACH STRING IN THE STRING LIST. BX HOLDS THE OFFSET OF THE FIRST
; ENTRY IN THE STRING L.     L. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;**************************************************

```
DO_A_STRING:  MOV        BX,[BX]           ;BX HOLDS OFFSET OF NEXT STRING DESC
              INC        BX                ;MAKE BX POINT TO WORD HOLDING
```

```
                INC         BX              ;OFFSET OF NEXT STRING DESC AND
                PUSH        BX              ;SAVE ON STACK FOR NEXT LOOP

; NOW LOAD PARAMETERS FOR CURRENT STRING

MOV         BX,DX           ;OFFSET OF CURRENT STRING DESC
                MOV         AX,[BX+STDESC_XCOORD]
                MOV         XCOORD,AX

MOV         AX,[BX+STDESC_YCOORD]
                MOV         YCOORD,AX

MOV         AL,[BX+STDESC_FONT]
                MOV         FONT,AL

MOV         AL,[BX+STDESC_DIRECT]
                MOV         DIRECT,AL

PUSH        BX              ;SAVE WHILE DOING NEXT

SUB         BX,BX           ;MULTIPLY FONT BY 6
                MOV         BL,FONT         ;TO MAKE IT AN INDEX
                SHL         BX,1            ;INTO THE FONT_SPEC_TABLE
                MOV         DX,BX
                SHL         BX,1
                ADD         BX,DX

; NOW GET THE PARAMETERS FOR THE FONT REQUESTED

ADD         BX,OFFSET FONT_SPEC_TABLE

MOV         AL,CS:[BX+FDESC_WIDTH]
                MOV         WIDTH,AL        ; WIDTH IN BYTES

MOV         AL,CS:[BX+FDESC_HEIGHT]
                MOV         HEIGHT,AL       ; HEIGHT IN BITS

MOV         AL,CS:[BX+FDESC_HSPACE]
                MOV         HSPACE,AL

MOV         AL,CS:[BX+FDESC_VSPACE]
                MOV         VSPACE,AL

MOV         AX,CS:[BX+FDESC_IPTOFFS]
                MOV         IPT_OFFS,AX

; NOW INITIALIZE ROW/COL POSITIONERS

MOV         HORIZ,0
                MOV         VERT,0

POP         BX ; RESTORE OFFSET OF CURRENT STRING DESCRIPTOR
                PUSH        CX ; SAVE STRING COUNTER

;SET UP REGISTERS TO LOOP THROUGH CHARACTERS OF CURRENT STRING

MOV         SI,NEXT_CELL
                ADD         BX,STDESC_COUNT ;BX IS OFFSET OF CHARACTER COUNT
                SUB         CH,CH
                MOV         CL,[BX]         ;LOOP COUNT = NUMBER OF CHARS

DO_A_CHAR:      INC         BX              ;POINT TO CURRENT CHAR
                SUB         AX,AX
                MOV         AL,[BX]         ;GET THE CHAR
                PUSH        BX              ;SAVE PTR FOR NEXT LOOP
                SHL         AX,1
                ADD         AX,IPT_OFFS     ;POINT TO IPT ENTRY FOR CHAR
                MOV         BX,AX
                MOV         AX,CS:[BX]      ;GET FONT ROW OFFSET FOR CHAR

; NOW BUILD THE CELL SPEC POINTED TO BY SI REG

MOV         [SI+CSPEC_ROWOFFS],AX ;ROW OFFSET
```

```
MOV        AX,YCOORD
ADD        AX,VERT
MOV        [SI+CSPEC_SCANLINE],AX    ;CHAR ORIGIN SCANLINE

MOV        AX,XCOORD
ADD        AX,HORIZ
MOV        DX,AX
AND        AX,0007H
MOV        [SI+CSPEC_XBITOFFS],AL    ;CHAR ORIGIN BIT REMAINDER

SHR        DX,1
SHR        DX,1
SHR        DX,1
MOV        [SI+CSPEC_XBYTEOFFS],DL   ;CHAR ORIGIN MSB BYTE

MOV        AL,WIDTH
MOV        [SI+CSPEC_WIDTH],AL       ;CHAR WIDTH IN BYTES

MOV        AL,HEIGHT
MOV        [SI+CSPEC_HEIGHT],AL      ;CHAR HEIGHT IN BITS

;**************************************************************
; NOW CHECK DIRECTION TO COMPUTE CUMULATIVE POSITIONERS FOR NEXT
; CHARACTER THE DRAWING SHOWS THE PRINT ORIENTATIONS
;**************************************************************
```

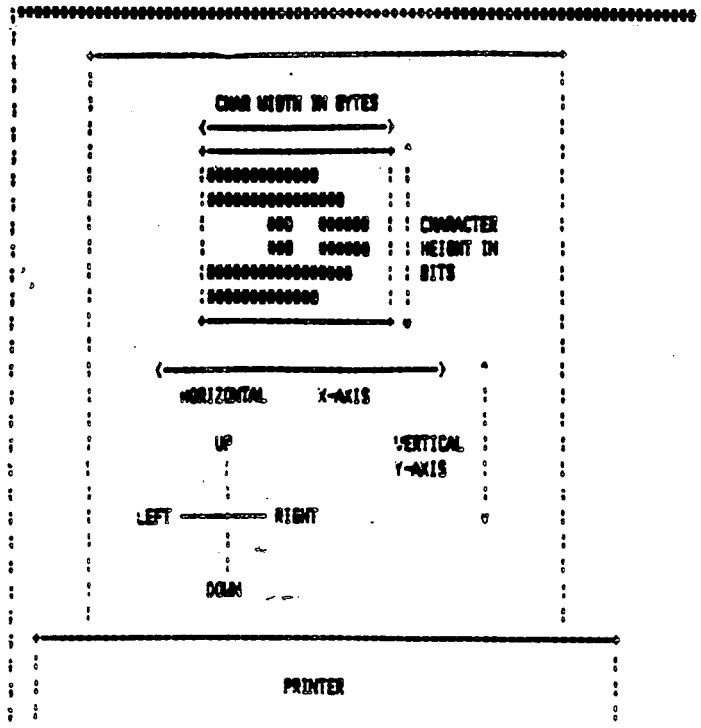

```
; NORMAL ORIENTATION FOR CHECK PRINTING IS "DOWN"
; NORMAL ORIENTATION FOR RECEIPTS WOULD BE "RIGHT"
;
; FONTS:
; Letter "A"                      CHAR WIDTH IN BYTES  = 1
;                                 CHAR HEIGHT IN BITS  = 5
;                                 HORIZ SPACING IN BITS = 10
;                                 VERT SPACING IN BITS  = 7
;        1 BYTE
```

```
                SUB
TRY_RIGHT:                      DIRECT,RIGHT    ;NORMAL, SO TRY THIS 1ST ;SAVE TIME
                                JNE  TRY_UP     ;NOT RIGHT- GO ON
DO_RIGHT:       MOV             AL,HSPACE       ;NORMAL ORIENTATION ON A RECEIPT
                ADD             HORIZ,AX        ;NEXT CHAR IN THIS STRING WILL BE PLACED
                JMP             CSPEC_DONE      ;THIS CHARACTER'S HORIZONTAL SPACING
                                                ;TO THE RIGHT OF THIS CHARACTER
TRY_UP:         CMP             DIRECT,UP
                JNE             TRY_LEFT
DO_UP:          MOV             AL,VSPACE       ;NEXT CHAR WILL BE PLACED THIS
                SUB             VERT,AX         ;CHAR'S VERTICAL SPACING ABOVE
                JMP             CSPEC_DONE      ;THIS CHARACTER

TRY_LEFT:       CMP             DIRECT,LEFT     ;UPSIDE DOWN & BACKWARDS PRINTING
                JNE             DO_DOWN
DO_LEFT:        MOV             AL,HSPACE       ;NEXT CHAR WILL BE PLACED THIS
                SUB             HORIZ,AX        ;CHAR'S HORIZONTAL SPACING TO THE
                JMP             CSPEC_DONE      ;LEFT OF THIS CHARACTER

DO_DOWN:        MOV             AL,VSPACE       ;NEXT CHAR WILL BE PLACED THIS
                ADD             VERT,AX         ; CHAR'S VERTICAL SPACING BELOW
                                                ;THIS CHARACTER. NORMAL
                                                ; ORIENTATION FOR CHECK

CSPEC_DONE:     ADD             SI,CSPEC_SIZE_IN_BYTES
                INC             TOTAL_CELLS
                POP             BX              ;RESTORE OFFSET OF
                DEC             CX              ;THIS CHAR IN
                JZ              STRING_DONE     ;STRING DESCRIPTOR
                JMP             DO_A_CHAR

STRING_DONE:    POP             CX              ;RESTORE STRING LOOP CTR
                POP             BX              ;RESTORE OFFSET OF
                MOV             NEXT_CELL,SI    ;SAVE THE OFFSET
                DEC             CX              ;NEXT SLOT IN STRING
                JZ              SORT_CSPECS     ;TABLE
                JMP             DO_A_STRING

;****************************************************************
; IN-PLACE BUBBLE SORT OF CSPEC LIST INTO ASCENDING ORDER BASED ON
; CONTENTS OF 1ST WORD IN EACH CELL SPEC
;****************************************************************

SORT_CSPECS:    MOV             CX,TOTAL_CELLS
                DEC             CX              ;OUTER LOOP IS DONE n - 1 TIMES
I_LOOP:         PUSH            CX              ;SAVE OUTER LOOP COUNTER

MOV             BX,CSPECS_START ;BEGINNING OF TABLE TO SORT
                MOV             SWAPPED,0       ;SET FLAG CLEAR FOR NEXT INNER LOOP
                MOV             CX,TOTAL_CELLS  ;INNER LOOP IS DONE n - 2
                SUB             CX,2            ;TIMES
J_LOOP:         PUSH            CX              ;SAVE INNER LOOP COUNTER
                MOV             AX,[BX]         ;COMPARE ACT_CSPEC_INDICES FOR
                CMP             AX,[BX+8]       ;TWO ADJACENT CELLS. IF OUT OF
                JNB             NO_SWAP         ;ORDER, THEN SWAP THEIR CONTENTS
SWAP:           CX                              ;SAVE INNER LOOP CX
                                CX,CSPEC_SIZE_IN_BYTES/2 ;LOOP HERE ONCE FOR EACH
                                                ;WORD IN A CELL SPEC
SWAP_LOOP:      MOV             AX,[BX]         ;GET THE WORDS TO SWAP
                MOV             DX,[BX+8]
                MOV             [BX],DX         ;PUT THEM BACK IN SWAPPED
                MOV             [BX+8],AX       ;POSITIONS
                ADD             BX,2
                LOOP            SWAP_LOOP

POP             CX

MOV             SWAPPED,1       ;SET FLAG SAYING AT LEAST ONE SWAP
                                                ;IN THRU INNER LOOP
```

```
                    JMP         NEXT_J

NO_SWAP:            ADD         BX,8            ;ADJUST POINTER UP ONE CELLSPEC

NEXT_J:             POP         CX              ;RESTORE INNER LOOP COUNTER

LOOP        J_LOOP

CMP         SWAPPED,0       ;IF FLAG WAS SET, SWAPS WERE MADE
                    JNE         NOT_DONE        ;AND WE ARE NOT DONE
                    POP         CX              ;BUT IF FLAG WAS NOT SET,
                                                ;RESTORE STACK
                    JMP         LISTS_DONE      ;AND GET OUT OF SORT ROUTINE

NOT_DONE:           POP         CX              ;RESTORE OUTER LOOP COUNTER
                    LOOP        I_LOOP

;************************************************************
; CELL SPEC LIST IS SORTED AND READY TO PROCESS SEQUENTIALLY
; NOW FIRE UP THE PRINTER, BUILD SCANLINES, AND PRINT IT ALL
;************************************************************

LISTS_DONE:         CALL        REL_CLAMP       ; RELEASE PAPER CLAMP
                    CALL        ACT_INIT        ; INITIALIZE ACTIVE LIST
                    MOV         SCANLINE,0
                    MOV         SOL,01H         ; READY FIRST SOLENOID
                    MOV         INSERTED,0
                    MOV         AX,CSPECS_START
                    MOV         NXTSCNK,AX
                    CALL        SOLENOIDS_OFF   ; RELEASE ANY SOLENOIDS THAT
                                                ; MIGHT INADVERTENTLY BE ON
                    CALL        MOTOR_ON        ; START MOVING PAPER

;************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND BUMP IT EVERY TIME THEREAFTER THAT A PRINT CLOCK SIGNAL IS
; DETECTED.
;************************************************************

WAIT4RST:           CALL        PRTST
                    AND         AL,AL
                    JZ          WAIT4RST

;************************************************************
; CHECK NOW TO DETERMINE WHETHER ALL SCANLINES HAVE BEEN MADE
; AND, IF SO, QUIT AND TURN OFF THE MOTOR BEFORE RETURNING
;************************************************************

WENWERST:           CMP         SCANLINE,MAX_SCANS
                    JE          CHECK_PRINTED

CALL        BUILD_NXT_SCAN
                    MOV         BIT,0;

;************************************************************
; WAIT TILL PRINT CLOCK HAS BEEN ASSERTED
;************************************************************

WAIT4CLK:           CALL        PRTST
                    AND         AH,AH
                    JZ          WAIT4CLK

;       CHECK WHETHER ALL BITS IN THE SCANLINE HAVE BEEN ACCOUNTED FOR

WENWECLK:           CMP         BIT,BITS_PER_SCAN
                    JNE         OLDE_BIT
                    INC         SCANLINE
                    JMP         WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID
```

```
OO_DE_BIT:          AND         PR_SHADOW, 0FCH ; OFF ALL SOLENOIDS

CALL        ISOLATE_BIT     ; TEST BIT "BIT"
                    AND         AL,AL           ; TEST VALUE PUT HERE
                                                ; BY ISOLATE_BIT
                    JZ          DONT_FIRE

; WE WILL FIRE THE NEXT SOLENOID THIS TIME

FIRE_ONE:           MOV         BL,SOL
                    OR          PR_SHADOW,BL

;       WE MAY OR MAY NOT HAVE ORED A SOLENOID BIT INTO THE SHADOW AT THIS POINT

DONT_FIRE:          INC         BIT             ; POINT TO NEXT BIT
                    CMP         SOL,SOL4        ; IF TRUE RESET TO SOL1
                    JE          SOL_IS_8
SOL_NOT_8:          SHL         SOL,1           ; OTHERWISE SET NEXT SOL
                    JMP         WRITE_SHADOW
SOL_IS_8:           MOV         SOL,SOL1                        ; RESETS SOL TO SOL1

; WRITE THE VALUE IN THE SHADOW REGISTER TO THE OUTPUT PORT

WRITE_SHADOW:       MOV         AL, PR_SHADOW
                    MOV         PRINT_PORT,AL

; NOW WAIT FOR THE NEXT PRINT CLOCK

JMP         WAIT4CLK

; THE LAST SCANLINE SHOULD HAVE BEEN PRINTED.
        ; NOW TURN OFF THE MOTOR AND ALL SOLENOIDS AND RETURN

CHECK_PRINTED:      CALL        MOTOR_OFF:
                    CALL        SOLENOIDS_OFF

; NOW ALL DONE PRINTING, RETURN TO THE ROUTINE THAT CALLED PNTR

;       POPA        **** 80186 INST.    ; RESTORE ALL REGISTERS REPLACED BY
                                        ; THE FOLLOWING

POP         BP
                    POP         SI
                    POP         DI
                    POP         SS
                    POP         ES
                    POP         DS
                    POP         DX
                    POP         CX
                    POP         BX
                    POP         AX

RET

;ROUTINES FOR MANAGING THE ACTIVE CELL LIST

;INITIALIZING THE ACTIVE CELL LIST

ACT_INIT:           MOV         BX,OFFSET ACTIVE_CELL_TABLE
                    MOV         CX,SIZE_OF_ACT
                    MOV         AX,01H
INIT_ACT:           MOV         [BX+ACT_FWD_PTR],AX ;LINK EACH ENTRY BY
                    INC         AX              ;MAKING EACH FORWARD
                    ADD         BX,6            ;POINTER POINT TO THE
                    LOOP        INIT_ACT        ;NEXT ENTRY IN THE LIST

MOV         FREE_LIST,0     ;FREE LIST STARTS WITH 0th ENTRY
```

```
                       MOV        NUMBER_ACTIVE,0   ;ACTIVE LIST IS NULL
                                  ACTIVE_LIST,0FFFFH
                       ret                          ;ALL DONE ;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL   (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE_ENTRY(BKPTR) = ACTIVE_LIST INSERT_INTO_ACT:
                       CMP        NUMBER_ACTIVE,MAX_ACTIVE_CELLS
                       JAE        TOO_MANY_INSERTS
; MAKE OLD_ACT = ACTIVE_LIST CX USED TO HOLD OLD_ACTIVE
                       MOV        DX,ACTIVE_LIST
                       MOV        CX, DX ; ACTIVE_LIST = FREE_LIST
                       MOV        SI, FREE_LIST
                       MOV        ACTIVE_LIST,SI ; FREE_LIST = FORMER 3RD ENTRY IN FREE LIST. MULTIPLY INDEX BY 6
                       SHL        SI,1
                       MOV        DI,SI
                       SHL        SI,1
                       ADD        SI,DI
                       MOV        BX, OFFSET ACTIVE_CELL_TABLE
                       MOV        DI, [BX+SI+ACT_FWD_PTR]
                       MOV        FREE_LIST, DI ; SI STILL POINTS TO OFFSET OF NEW ACTIVE ENTRY
; FIX UP THREE ENTRIES IN NEWLY ACTIVE CELL
                       MOV        [BX+SI+ACT_CSPEC_INDEX], AX  ; INDEX OF CSPEC BEING ADDED
                       MOV        WORD PTR [BX+SI+ACT_BACK_PTR],0FFFFH
                       MOV        AX, CX
                       MOV        [BX+SI+ACT_FWD_PTR],AX
                       CMP        AX,0FFFFH
                       JE         BUMP_ACTIVES ; OLD_ACTIVE WAS NOT NULL, SO LINK ITS BACK PTR TO THE NEW HEAD OF ACTIVES
; AX HOLDS OLD_ACTIVE. MULTIPLY IT BY 6
                       SHL        AX,1
                       MOV        SI,AX
                       SHL        SI,1
                       ADD        SI,AX
                       MOV        AX,ACTIVE_LIST
                       MOV        [BX+SI+ACT_BACK_PTR],AX
BUMP_ACTIVES:                     NUMBER_ACTIVE
TOO_MANY_INSERTS:      ret ;ROUTINE TO REMOVE COMMITTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED REMOVE_FROM_ACT:
                       CMP        NUMBER_ACTIVE,0        ;IF NONE WE HAVE
                                                         ;A PROBLEM
                       JE         OK_TO_REMOVE
                       JMP        TOO_MANY_REMOVALS
OK_TO_REMOVE:          MOV        BX,OFFSET ACTIVE_CELL_TABLE  ;HEAD OF TABLE
                       MOV        SI,AX                  ;MULTIPLY INDEX BY 6
                       SHL        SI,1                   ;TO MAKE IT A BYTE
                       MOV        CX,SI                  ;INDEX INTO THE ACT
                       SHL        SI,1
                       ADD        SI,CX
```

```
                MOV     BX,[BX+SI+ACT_BACK_PTR] ;SAVE THIS
                MOV     BACK,BX

MOV     BX,[BX+SI+ACT_FWD_PTR]  ;AND THIS
                MOV     FWD,BX

MOV     BX,FREE_LIST    ;LINK THIS ENTRY INTO
                MOV     [BX+SI+ACT_FWD_PTR],BX

MOV     FREE_LIST,AX    ;FREE LIST AHEAD OF ALL OTHERS
                CMP     BACK,0FFFFH     ;WAS HEAD OF ACT HOLDING
                JNE     NOT_FIRST       ;THE FIRST ENTRY IN FREE LIST
FIRST:          MOV     AX,FWD          ;YES, IT WAS
                MOV     ACTIVE_LIST,AX  ;ACTIVE NOW POINTS TO WHAT
                                        ;THIS ENTRY USED TO POINT TO

MOV     SI,AX           ;MAKE THIS INTO BYTE INDEX
                SHL     SI,1
                MOV     CX,SI
                SHL     SI,1
                ADD     SI,CX
                MOV     WORD PTR [BX+SI+ACT_BACK_PTR],0FFFFH
                                        ;MAKE SUCESSOR'S
                                        ;BACK PTR NULL
                                        ;BECAUSE IT IS NEW HEAD
                                        ;OF ACTIVE LIST
                DEC     NUMBER_ACTIVE   ;ALL DONE
                RET

NOT_FIRST:      CMP     FWD,0FFFFH      ;IS ENTRY TO BE REMOVED IN MIDDLE
                JNE     MIDDLE
LAST:           MOV     SI,BACK         ;NO, IT IS LAST IN LIST
                SHL     SI,1
                MOV     CX,SI           ;MAKE THE PREDECESSOR'S
                SHL     SI,1            ;FORWARD
                ADD     SI,CX           ;POINTER
                ---     WORD PTR [BX+SI+ACT_FWD_PTR],0FFFFH
                                        ;NULL FWD PTR BECAUSE LAST
                DEC     NUMBER_ACTIVE
                RET                     ;ALL DONE

MIDDLE:         MOV     SI,FWD          ;CELL TO BE REMOVED IS
                SHL     SI,1            ;SOMEWHERE IN THE MIDDLE
                MOV     CX,SI
                SHL     SI,1            ;MAKE PREDECESSOR'S
                ADD     SI,CX           ;FWD POINTER
                MOV     AX,BACK         ;POINT TO SUCESSOR
                MOV     [BX+SI+ACT_BACK_PTR],AX
                MOV     SI,AX           ;AND MAKE
                SHL     SI,1            ;SUCESSOR'S
                MOV     CX,SI           ;BACK PTR
                SHL     SI,1            ;POINT TO
                ADD     SI,CX           ;PREDECESSOR
                MOV     AX,FWD
                MOV     [BX+SI+ACT_FWD_PTR],AX
                DEC     NUMBER_ACTIVE
TOO_MANY_REMOVALS: RET                  ;ALL DONE

; ROUTINE TO DETERMINE THE STATE OF A BIT IN THE SCANLINE BUFFER

ISOLATE_BIT:    SUB     BX,BX           ; CLEAR THIS REGISTER
                MOV     BL,BIT          ; GET INDEX OF BIT IN
                                        ;   SCANLINE BUFFER
                MOV     DL,BL           ; SAVE IT TEMPORARILY
                MOV     CX,3            ; FOR DIVIDE BY 8 TO GET
                SHR     BX,CL           ;   BYTE INDEX OF BUFF
                AND     DL,7            ; FIND BIT REMAINDER
                INC     DL              ; FOR BITS TO SHIFT OUT
                ADD     BX,OFFSET BUFF  ; POINT TO BYTE IN MEM
                MOV     AL,[BX]         ; READ BYTE OF BUFF
                MOV     CL,DL           ; SHIFT COUNT
```

```
                    SHR     AL,CL       ; SHIFT DESIRED BIT OUT
                                        ; TO CARRY FLAG
                    JC      SET_BIT     ; IF CARRY THEN BIT = T
                    SUB     AX,AX       ; CLR AX IF BIT FALSE
                    RET
SET_BIT:            MOV     AX,1        ; SET AX IF BIT TRUE
                    RET

; ROUTINE TO TURN OFF ALL FOUR SOLENOIDS

SOLENOIDS_OFF:      AND     PR_SHADOW, NOT_SOLENOIDS
                    MOV     AL, PR_SHADOW
                    MOV     PRINT_PORT, AL
                    RET

; ROUTINE TO TURN MOTOR

MOTOR_ON:           OR      PR_SHADOW, MTRDRV
                    AND     PR_SHADOW, NOT_MTRSTP
                    MOV     AL, PR_SHADOW
                    MOV     PRINT_PORT, AL
                    RET

; ROUTINE TO TURN MOTOR OFF

MOTOR_OFF:          OR      PR_SHADOW, MTRSTP
                    AND     PR_SHADOW, NOT_MTRDRV
                    MOV     AL, PR_SHADOW
                    MOV     PRINT_PORT, AL
                    RET

; ROUTINE TO REMOVE ALL POWER FROM MOTOR

MTR_PWR_OFF:        AND     PR_SHADOW, NOT_MTRSTP
                    AND     PR_SHADOW, NOT_MTRDRV
                    MOV     AL, PR_SHADOW
                    MOV     PRINT_PORT, AL
                    RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:      AND     PR_SHADOW, NOT_SOLENOIDS
                    MOV     AL, SOL
                    OR      PR_SHADOW, AL
                    MOV     PRINT_PORT, AL
                    RET

; ROUTINE TO SET THE STATE OF THE PAPER CLAMP TRUE, TO HOLD THE PAPER

SET_CLAMP:          OR      PR_SHADOW, CLAMP_ON
                    MOV     AL, PR_SHADOW
                    MOV     PRINT_PORT, AL
                    RET

; ROUTINE TO RELEASE THE PAPER CLAMP

REL_CLAMP:          AND     PR_SHADOW, CLAMP_OFF
                    MOV     AL, PR_SHADOW
                    MOV     PRINT_PORT, AL
                    RET
```

```
;*********************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;*********************************************

;       FIRST, CLEAR OUT THE OLD BUFFER SO ALL NEW DATA MAY BE ORED IN

BUILD_NXT_SCAN:
                MOV     CX,80H          ; NUMBER OF WORDS TO CLEAR
                SUB     AX,AX           ; CLEAR THIS TO ZERO
                MOV     BX, OFFSET BUFF
CLR_BUFF:       MOV     [BX], AX;
                INC     BX
                INC     BX
                LOOP    CLR_BUFF

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

CHECK4INSRT:    MOV     BX, INSERTED
                CMP     BX, TOTAL_CELLS
                JE      PROCESS_ACT

;       IF THEY HAVE NOT ALL BEEN PLACED INTO ACT THEN CHECK TO SEE IF ANY
;       WILL GO INTO ACT FOR THIS SCANLINE

MOV     BX, NXT2CHK     ; OFFS OF NXT CSPEC TO CHECK
                MOV     AX,[BX]         ; AX NOW HAS SCANLINE
                CMP     AX,SCANLINE     ; IS IT = CURRENT SCANLINE?
                JNE     PROCESS_ACT     ; IF NOT, NO INSERTS

;       NOW INSERT CELLS INTO ACT WHILE THEIR SCANLINES ARE
;       EQUAL TO CURRENT SCANLINE

INSERT_CELL:    MOV     AX,BX           ; OFFS OF CSPEC TO INSERT
                INC     INSERTED        ; INDEX OF CSPEC TO GO IN
                CALL    INSERT_INTO_ACT
                ADD     NXT2CHK, CSPEC_SIZE_IN_BYTES
                JMP     CHECK4INSRT

;       NOW PROCESS ALL ACTIVE CELLS FIRST CHECK WHETHER ANY ARE ACTIVE

PROCESS_ACT:    CMP     NUMBER_ACTIVE,0
                JG      SOME_R_ACTV
                RET                     ; BECAUSE NONE R ACTIVE

SOME_R_ACTV:    MOV     SI,ACTIVE_LIST  ; INDX OF ACT OF 1ST ENT
                MOV     NEXT_ENT,SI     ; IS NEXT TO LOOK AT
NEXT_CSPEC:     MOV     SI,NEXT_ENT     ; NEXT IS CURRENT
                MOV     THIS_ENT,SI     ; ONE TO LOOK AT
                SHL     SI,1            ; MAKE THIS_ENT AN INDX
                MOV     DI,SI
                OR      SI,1
                            SI,DI
;       SAVE INDEX IN ACT OF NEXT ENTRY TO CHECK, MAY BE FFFF IF NO MORE

MOV     BX,OFFSET ACTIVE_CELL_TABLE
                MOV     DX,[BX+SI+ACT_FWD_PTR] ; LINK TO NXT ACTIVE CELL
                MOV     NEXT_ENT,DX

;       NOW GET OFFSET OF CSPEC TO EXAMINE FIRST; BX STILL HAS OFFSET OF ACT

MOV     BX,[BX+SI]      ; CSPEC OFFSET IN SORTED TABLE

;       PROCESS ONE CELL SPEC

MOV     DI,[BX+CSPEC_XBYTESOFFS]
                AND     DI, 00FFH       ; WE ONLY WANT BYTE IN LOW
                                        ; HALF OF DI REG
                MOV     SI,[BX+CSPEC_RGBOFFS]
                SUB     CX,CX
```

```
ONE_CELL:   MOV     CL,[BX+CSPEC_WIDTH]
            SUB     DX,DX           ; CLEAR SAVE REGISTER
            SUB     AX,AX           ; CLEAR WORK REGISTER
            MOV     AH,CS:[SI]      ; READ A BYTE OF FONT MEM
                                    ; FROM CODE SEGMENT
            PUSH    CX
            MOV     CL,[BX+CSPEC_XBITOFF]
            SHR     AX,CL           ; ALIGN WITH SCANLINE
                                    ; BIT OFFSET
            POP     CX              ; RESTORE WIDTH LOOP CTR
            OR      AH,DH           ; OR IN SAVED BITS FROM
                                    ; PREVIOUS BYTE
            MOV     BP, OFFSET BUFF
            OR      DS:[BP+DI],AH   ; OR DATA INTO SCANLINE
            MOV     DH,AL           ; SAVE BITS SHIFTED OUT
            INC     DI              ; INC SCANLINE BYTE INDEX
            INC     SI              ; INC FONT MEM INDEX
            LOOP    ONE_CELL

; NOW IF DH NOT ZERO THEN THERE WAS DATA SHIFTED OUT OF AX WHICH MUST
; ALSO BE ORED INTO THE SCANLINE. THE BYTE OFFSET IN DI HAS BEEN INCREMENTED
; SO JUST OR IN DH RATHER THAN AH

OR      DS:[BP+DI],DH

MOV     [BX+CSPEC_MEMOFFS],SI
                                    ; UPDATE FONT MEM OFFSET
            DEC     BYTE PTR [BX+CSPEC_HEIGHT]
            JNZ     GETNXTCSPC
            MOV     AX,THIS_ENT
            CALL    REMOVE_FROM_ACT
GETNXTCSPC: CMP     NEXT_ENT, 0FFFFH
            JNE     NEXT_CSPEC

NO_MORE_ACTV: RET                   ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

What is claimed is:

1. A money order dispenser for dispensing money orders at a retail establishment, comprising:
   a digital processor for controlling the operation of the dispenser;
   a keyboard connected to the digital processor for entering transaction data, control data for managing the operation of the dispenser, a ffirst security code authorizing access to the dispenser to enable entry of said control data, and a second security code authorizing the printing of a money order;
   a display connected to the digital processor for displaying the transaction and control data entered on the keyboard;
   a memory associated with the digital processor for storing the transaction data and control data;
   a printer controlled by said digital processor for receiving a money order and printing alphanumeric indicia thereon;
   means for detecting entry of the first and second security codes via the keyboard; and
   control means responsive to the detecting means for inhibiting entry of the control data via the keyboard when the first security code is not properly entered on the keyboard and for inhibiting operation of the dispenser when the second security code is not properly entered on the keyboard.

2. A money order dispenser for dispensing money orders at a retail establishment, comprising:
   a data collector controlled by a system operator for managing the security and operation of the dispenser;
   a digital processor for controlling the operation of the dispenser;
   a digital processor keyboard connected to the digital processor for entering transaction data by the vendor;
   a data collector keyboard connected to the data collector for entering the control data and the initial first and second security codes by the system operator for managing the operation of the dispenser;
   a first security code authorizing access to the dispenser to enable entry of the transaction data;
   a second security code authorizing the operation of the money order dispenser;
   a display connected to the digital processor for displaying the transaction data entered on the digital processor keyboard;
   a memory associated with the digital processor and the data collector for storing the transaction data and the control data;
   a printer controlled by the digital processor for receiving a money order and printing alphanumeric indicia thereon;
   means for detecting entry of the first and second security codes via the digital processor keyboard and for detecting if the security of the dispenser is compromised;
   control means responsive to the detecting means for inhibiting entry of the transaction data via the digital processor keyboard when the first security code is not properly entered on the digital processor keyboard and for inhibiting operation of the money order dispenser when the second security code is not properly entered on the digital processor keyboard; and means for changing the initial first and second security codes via the data collector by the system operator if the security of the dispenser is compromised or if any of the parameters of the control data entered via the data collector by the system operator are compromised or exceeded.

3. A money order dispenser in accordance with claim 2, wherein the initial first and second security codes established by the system operator comprise a five (5) digit number that is not displayed.

4. A money order dispenser in accordance with claim 2, wherein the initial first and second security codes are stored by the system operator in the data collector in an electrically-erasable, programmable read only memory ($E^2PROM$) which is down loaded from the data collector to the dispenser.

5. A money order dispenser in accordance with claim 2, wherein the system operator via the data collector sets predetermined values for the following control data for the dispenser:
   (a) the total number of money orders to be printed before the dispenser must be reauthorized;
   (b) the maximum money order dollar amount to be issued before the dispenser must be reauthorized;
   (c) the maximum dollar value per money order per customer;
   (d) the maximum number of vendor payments which may be printed before the dispenser must be reauthorized;
   (e) the maximum vendor payment dollar amount which can be issued before the dispenser must be reauthorized;
   (f) the maximum number of money orders that can be printed per customer;
   (g) the maximum number of vendor payments which can be printed per vendor;
   (h) the maximum dollar amount per vendor payment;
   (i) the number of blank money orders left in dispenser when warning is issued;
   (j) the amount of transaction storage left in dispenser money when warning is issued;
   (k) the number of errors allowed before the dispenser locks.

6. A money order dispenser for dispensing money orders at a retail establishment, comprising:
   a digital processor for controlling the operation of the dispenser;
   a digital processor keyboard connected to the digital processor for entering transaction data by the vendor;
   a first security code authorizing access to the dispenser to enable entry of the transaction date;
   a second security code authorizing the operation of the money order dispenser;
   a display connected to the digital processor for displaying the transaction data entered on the digital processor keyboard;
   a memory associated with the digital processor for storing the transaction data and the control data;
   a printer controlled by the digital processor for receiving a money order and printing alphanumeric indicia thereon;
   means for entering the control data and the initial first and second security codes;
   means for changing the initial first and second security codes if the security of the dispenser is compromised or if any of the parameters of the control data are compromised or exceeded;
   means for detecting entry of the first and second security codes via the digital processor keyboard and for detecting if the security of the dispenser is compromised; and
   control means responsive to the detecting means for inhibiting entry of the transaction data via the digital processor keyboard when the first security code is not properly entered on the digital processor keyboard and for preventing the operation of the money order dispenser when the second security code is not properly entered on the digital processor keyboard.

7. A system for dispensing money orders at at least one retail establishment, comprising:
   a money order dispenser for dispensing money orders at a retail establishment;
   a digital processor for controlling the operation of the dispenser;
   a memory associated with the digital processor for storing the transaction data and control data;
   a printer with a compartment for storing blank money order forms and coupled to the money order dispenser for receiving a money order and printing alphanumeric indicia thereon;
   a data collector remotely connected to the money order dispenser;
   means in the data collector for transmitting information to the money order dispenser; and
   a host computer remotely located from the retail establishment; and
   means for coupling the host computer to the dispenser located at the retail establishment at selectable predetermined times through a communications link for management and control of the dispenser.

8. A system in accordance with claim 7 wherein the host computer further comprises a means for inhibiting the operation of the dispenser under predetermined conditions.

9. A system in accordance with claim 7 wherein the money order dispenser further comprises:
   a first security code and a second security code authorizing the operation of the dispenser;
   means for detecting if the security of the dispenser is compromised; and
   control means responsive to the detecting means for inhibiting operation of the dispenser when the security of the dispenser is compromised.

* * * * *